United States Patent
Baek et al.

(10) Patent No.: US 10,489,109 B2
(45) Date of Patent: Nov. 26, 2019

(54) ELECTRONIC DEVICE AND METHOD FOR CONTROLLING OPERATION OF ELECTRONIC DEVICE

(71) Applicant: SAMSUNG ELECTRONICS CO., LTD., Suwon-si, Gyeonggi-do (KR)

(72) Inventors: Inho Baek, Yongin-si (KR); Seungnyun Kim, Incheon (KR); Yongsang Yun, Osan-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/064,558

(22) PCT Filed: Nov. 17, 2016

(86) PCT No.: PCT/KR2016/013265
§ 371 (c)(1),
(2) Date: Jun. 21, 2018

(87) PCT Pub. No.: WO2017/111319
PCT Pub. Date: Jun. 29, 2017

(65) Prior Publication Data
US 2019/0026067 A1    Jan. 24, 2019

(30) Foreign Application Priority Data
Dec. 24, 2015 (KR) .................. 10-2015-0186133

(51) Int. Cl.
*G06F 3/16* (2006.01)
*G10L 25/51* (2013.01)
*H04R 1/32* (2006.01)

(52) U.S. Cl.
CPC .............. *G06F 3/165* (2013.01); *G10L 25/51* (2013.01); *H04R 1/326* (2013.01)

(58) Field of Classification Search
CPC ......... G06F 3/165; G10L 25/51; H04R 1/326; H04R 1/32; H04R 25/40; H04R 25/405;
(Continued)

(56) References Cited

U.S. PATENT DOCUMENTS

2012/0026837 A1    2/2012  Li et al.
2012/0114155 A1*   5/2012  Nishizaki .............. H04R 25/43
                                                        381/313
(Continued)

FOREIGN PATENT DOCUMENTS

JP            5514698         6/2014
KR      10-2013-0135535      12/2013
WO          2015/107382       7/2015

OTHER PUBLICATIONS

Extended Search Report dated Nov. 6, 2018 in counterpart European Patent Application No. 16879186.1.
(Continued)

*Primary Examiner* — Jason R Kurr
(74) *Attorney, Agent, or Firm* — Nixon & Vanderhye, P.C.

(57) ABSTRACT

An electronic device, according to one embodiment of the present invention, comprises: at least one microphone receiving sound from the outside, and configured to detect the direction from which the sound is received; a speaker for outputting the sound; a communication circuit for receiving audio data from an external electronic device; a processor electrically connected to at least one microphone, the speaker, and the communication circuit; and at least one memory electrically connected to the processor. The memory, when operated, can store instructions for enabling the processor to extract the information on the direction, from which the sound is received, from the data related to the sound received through at least one microphone, and to process the data related to the sound outputted through the
(Continued)

speaker, on the basis of the information on the direction from which the sound is received. Other examples are possible.

12 Claims, 18 Drawing Sheets

(58) Field of Classification Search
CPC ............. H04R 25/407; H04R 2430/20; H04R 2430/21; H04R 2430/23; H04R 1/22; H04R 1/20; H04R 1/222; H04S 7/304
See application file for complete search history.

(56) References Cited

U.S. PATENT DOCUMENTS

| | | |
|---|---|---|
| 2012/0215519 A1 | 8/2012 | Park et al. |
| 2013/0222230 A1 | 8/2013 | Choi et al. |
| 2014/0003611 A1 | 1/2014 | Mohammad et al. |
| 2015/0023514 A1 | 1/2015 | Shi et al. |
| 2015/0358730 A1* | 12/2015 | Kirsch ................... H04R 3/002 381/71.1 |
| 2016/0165350 A1* | 6/2016 | Benattar ................ H04R 5/033 381/310 |

OTHER PUBLICATIONS

International Search Report for PCT/KR2016/013265 dated Feb. 22, 2017, 4 pages.
Written Opinion for PCT/KR2016/013265 dated Feb. 22, 2017, 8 pages.

* cited by examiner

ELECTRONIC DEVICE AND METHOD FOR CONTROLLING OPERATION OF ELECTRONIC DEVICE This application is the U.S. national phase of International Application No. PCT/KR2016/013265 filed Nov. 17, 2016 which designated the U.S. and claims priority to KR Patent Application No. 10-2015-0186133 filed Dec. 24, 2015, the entire contents of each of which are hereby incorporated by reference.

TECHNICAL FIELD

Various embodiments of the present invention relate to an electronic device that can provide the user with an audio signal received from an external electronic device and a sound picked up from the outside, and a method for controlling the operation of the electronic device.

BACKGROUND ART

Various electronic devices have been used in daily life in recent years. In some cases, plural electronic devices may cooperate with each other to perform a specific function. For example, one user may carry a portable terminal (e.g., mobile phone or tablet), a wearable device (e.g., smart watch or smart band), and an auditory device for receiving a sound from the outside and outputting it to the user and use them together. The auditory device may be wirelessly linked with an external electronic device (e.g., smart TV), and may receive an audio signal from the external electronic device and provide it to the user. The auditory device may provide the user with an audio signal streamed from the external electronic device and a sound picked up from the outside (e.g., another person) together. However, when an audio signal received from the external electronic device and a sound directly picked up from the outside are provided together, it is necessary to control the output of the audio signal and the picked up sound in accordance with the user's convenience.

DISCLOSURE OF INVENTION

Technical Problem

Accordingly, an aspect of the present invention is to provide an electronic device and operation control method therefor that can adjust the output levels (e.g., mixing ratio) for audio data received from an external device and sound data picked up from the outside by a microphone.

Another aspect of the present invention is to provide an electronic device and operation control method therefor that can sense a sound picked up from nearby surroundings (e.g., nearby person) and adjust the output level for the picked up sound in a manner appropriate to the situation while streaming an audio signal from an external device.

Solution to Problem

In accordance with an aspect of the present invention, there is provided an electronic device. The electronic device may include: at least one microphone configured to pick up a sound from the outside and to sense the direction of the picked up sound; a speaker configured to output a sound; a communication circuit configured to receive audio data from an external electronic device; a processor electrically connected with the at least one microphone, the speaker, and the communication circuit; and at least one memory electrically connected to the processor. The memory may store instructions that, when executed, cause the processor to: extract information on the direction in which the sound is picked up from the sound data picked up by the at least one microphone; determine the level of similarity between the received audio data and the sound data picked up by the microphone; and process sound data to be output through the speaker on the basis of the similarity level and the information about the direction in which the sound is picked up.

In accordance with another aspect of the present invention, there is provided a method of operation control for an electronic device. The method may include: receiving audio data from an external electronic device; picking up a sound from the outside of the electronic device through at least one microphone; extracting information on the direction in which the sound is picked up from the sound data picked up by the at least one microphone; and processing sound data to be output through a speaker based on the information about the direction in which the sound is picked up.

Advantageous Effects of Invention

In a feature of the present invention, the operation control method enables the electronic device to control the output level of the sound similar to an audio signal received from an external device among the sounds picked up by the microphone, so that the user can listen to the sound corresponding to the received audio signal without external noise.

In another feature of the present invention, the operation control method enables the electronic device to adjust the mixing ratio between audio data received from an external device and an external sound picked up by the microphone, thereby preventing an echo phenomenon caused by similar audio data and sound data.

In another feature of the present invention, the operation control method enables the electronic device to control, when an ambient sound different from the audio data received from an external device is picked up, the mixing ratio of the sounds to be output or the directionality of the electronic device, so that the user can smoothly hear a necessary sound in the surroundings.

MODE FOR THE INVENTION

Figure 1:
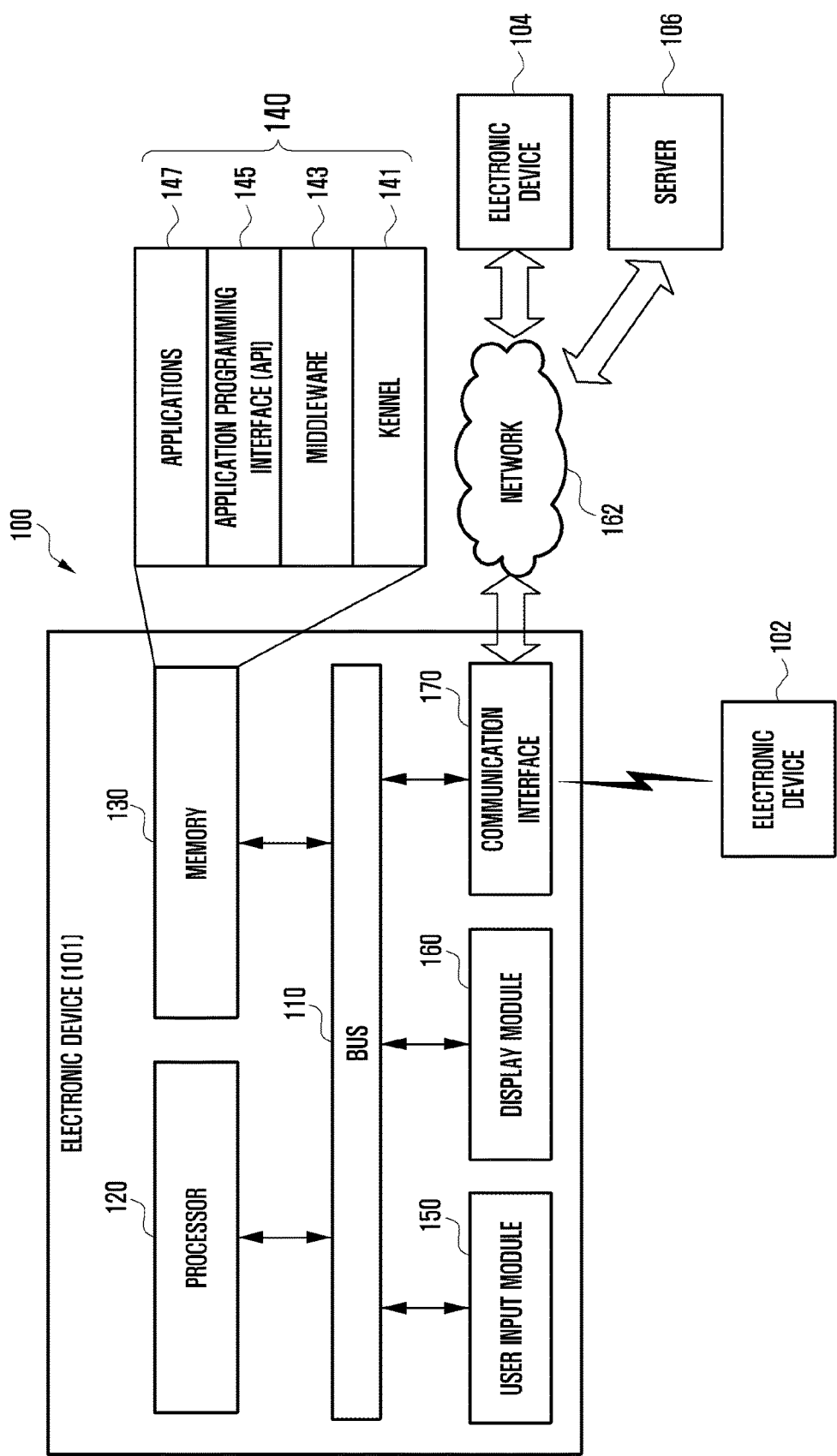
FIG. 1 illustrates electronic devices in a network environment according to various embodiments of the present invention.

Hereinafter, various embodiments of the present disclosure are described with reference to the accompanying drawings. However, it should be appreciated that the present disclosure is not limited to a specific embodiment and all modifications, equivalents, and/or alternatives thereof also belong to the scope of the present disclosure. The same or similar reference symbols are used throughout the drawings to refer to the same or like parts.

In the description, an expression "have", "may have", "include" or "may include" indicates the existence of a specific feature (e.g., number, function, operation, or component like a part) and does not exclude the existence of other features.

In the description, the expression "A or B", "at least one of A and/or B", or "one or more of A and/or B" may indicate all possible combinations of A and B. For example, "A or B", "at least one of A and B", and "at least one of A or B" may indicate any of (1) including at least A, (2) including at least B, or (3) including at least A and at least B.

In various embodiments, the terms "first" and "second" may refer to various elements regardless of importance and/or order and are used to distinguish one element from another element without limitation. For example, a first user device and a second user device may indicate different user devices regardless of the order or importance of the devices. As another example, a first component may be denoted as a second component, and vice versa without departing from the scope of the present disclosure.

It will be understood that when an element (e.g., first element) is referred to as being (operatively or communicatively) "coupled with/to" or "connected with/to" another element (e.g., second element), it can be coupled or connected with/to the other element directly or via a third element. In contrast, it will be understood that when an element (e.g., first element) is referred to as being "directly coupled with/to" or "directly connected with/to" another element (e.g., second element), no other element (e.g., third element) intervenes between the element and the other element.

In the description, the phrase "configured (or set) to" may be used interchangeably with the phrase "suitable for", "having the capacity to", "designed to", "adapted to", "made to" or "capable of" depending on circumstances. The term "configured (or set) to" does not essentially mean "specifically designed in hardware to." Rather, the phrase "configured to" may mean that a device can perform a specific operation together with other devices or parts. For example, the phrase "processor configured (or set) to perform A, B, and C" may mean a dedicated processor (e.g., embedded processor) for performing the operations or a general-purpose processor (e.g., central processing unit (CPU) or application processor) that may perform the operations by executing one or more software programs stored in a memory unit.

Some terms used herein may be provided merely to describe a specific embodiment without limiting the scope of another embodiment. In the description, the singular forms "a", "an" and "the" are intended to include the plural forms as well, unless the context clearly indicates otherwise. The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In any case, the terms defined herein should not be interpreted to exclude certain embodiments of the present disclosure.

The electronic device according to various embodiments of the present disclosure may include an auditory device such as a hearing aid. For example, the auditory device may include a housing having a part configured to be removably attachable to a portion of the user.

The electronic device according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical instrument, a camera, and a wearable device. In various embodiments, the wearable device may include at least one of an accessory-type wearable device (e.g., watch, ring, bracelet, anklet, necklace, glasses, contact lens, or head-mounted device (HMD)), a textile/clothing-integrated wearable device (e.g., electronic clothing), a body attachment device (e.g., skin pad or tattoo), and a bio-implantable wearable device (e.g., implantable circuit).

In some embodiments, the electronic device may be a home appliance. The home appliance may include at least one of, for example, a television (TV), a digital versatile disc (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and a digital photo frame.

In other embodiments, the electronic device may include at least one of a medical device (e.g., portable medical meter (such as a blood glucose meter, a heart rate meter, a blood pressure meter, or a temperature meter), a magnetic resonance angiography (MRA) instrument, a magnetic resonance imaging (MRI) instrument, a computed tomography (CT) instrument, a medical scanner, or an ultrasonic device), a navigation equipment, a global navigation satellite system (GNSS), an event data recorder (EDR), a flight data recorder (FDR), an automotive infotainment device, a marine electronic equipment (e.g., a marine navigation device, and a gyro compass or the like), avionics, a security device, a car head unit, an industrial or home robot, an automatic teller machine (ATM) for banks, a point-of-sale (POS) system for shops, and an internet of things (IoT) device (e.g., an electronic bulb, a sensor, an electricity or gas meter, a sprinkler device, a fire alarm, a thermostat, a streetlamp, a toaster, a fitness equipment, a hot-water tank, a heater, or a boiler).

In one embodiment, the electronic device may include at least one of a part of furniture or a building/structure, an electronic board, an electronic signature receiving device, a projector, or a measurement meter (e.g., a water meter, an electricity meter, a gas meter, or a radio wave meter). In various embodiments, the electronic device may be one or a combination of the above-described devices. In one embodiment, the electronic device may be a flexible electronic device. The electronic device according to an embodiment of the present disclosure is not limited to the above-described devices, and it may include a new electronic device to be developed as technology advances.

Next, a description is given of an electronic device according to various embodiments with reference to the accompanying drawings. In the description, the term "user" may refer to a person who uses the electronic device, or a device that uses the electronic device (e.g., artificial intelligence electronic device).

With reference to FIG. 1, a description is given of the electronic device 101 in a network environment 100. The electronic device 101 may include a bus 110, a processor 120, a memory 130, an input/output interface 150, a display 160, and a communication interface 170. In certain embodiments, at least one of the existing components may be omitted from the electronic device 101, or a new component may be added to the electronic device 101.

The bus 110 may include, for example, circuits that connect the components 110 to 170 to each other and transfer communication signals (e.g., control message and/or data) between the components 110 to 170.

The processor 120 may include one or more of a central processing unit (CPU), an application processor (AP), and a communication processor (CP). The processor 120 may control at least one component of the electronic device 101 and perform communication-related or data processing operations for the other components.

The memory 130 may include a volatile and/or nonvolatile memory. The memory 130 may store, for example, a command or data related to at least one component of the electronic device 101. In one embodiment, the memory 130 may store software and/or programs 140. The programs 140 may include, for example, a kernel 141, a middleware 143, an application programming interface (API) 145, and/or an application program (or application) 147. At least some of the kernel 141, the middleware 143 or the API 145 may be referred to as an operating system (OS).

The kernel 141 may control or manage the system resources (e.g., bus 110, processor 120, or memory 130) that are used to execute operations or functions implemented in other programs (e.g., middleware 143, API 145, or application program 147). Further, the kernel 141 may provide an interface that enables the middleware 143, the API 145 or the application program 147 to control or manage the system resources by accessing the individual components of the electronic device 101.

The middleware 143 may perform an intermediary role so that, for example, the API 145 or the application program 147 may exchange data with the kernel 141.

Further, the middleware 143 may schedule one or more work requests from the application programs 147 according to their priorities. For example, the middleware 143 may assign priorities to the application programs 147 for utilizing the system resources (e.g., bus 110, processor 120, or memory 130) of the electronic device 101. The middleware 143 may perform scheduling or load balancing for one or more work requests by processing them according to their priorities.

The API 145 is, for example, an interface that enables the applications 147 to control functions provided by the kernel 141 or the middleware 143 and may include at least one interface or function (e.g., command) for, for example, file control, window control, image processing, or character control.

The input/output interface 150 may serve as an interface that can receive a command or data from, for example, the user or other external device and forward the same to the other components of the electronic device 101. Further, the input/output interface 150 may output a command or data received from the other components of the electronic device 101 to the user or other external device.

The display 160 may include, for example, a liquid crystal display (LCD), a light emitting diode (LED) display, an organic LED (OLED) display, a micro-electromechanical systems (MEMS) display, or an electronic paper display. The display 160 may display a variety of content (e.g., text, image, video, icon, or symbol) for the user. The display 160 may include a touchscreen and may receive a touch input, a gesture input, a proximity input, or a hovering input through, for example, an electronic pen or a body portion of the user.

The communication interface 170 may establish communication between the electronic device 101 and an external device (e.g., first external electronic device 102, second external electronic device 104, or server 106). For example, the communication interface 170 may connect to the network 162 through wireless communication or wired communication to communicate with an external device (e.g., second external electronic device 104 or server 106).

Wireless communication may utilize at least one of, for example, long term evolution (LTE), LTE-advanced (LTE-A), code division multiple access (CDMA), wideband code division multiple access (WCDMA), universal mobile telecommunication system (UMTS), wireless broadband (WiBro), and global system for mobile communication (GSM), as a cellular communication protocol. Further, wireless communication may use, for example, short-range communication. Short-range communication may include at least one of, for example, wireless fidelity (Wi-Fi), Bluetooth, near field communication (NFC), and the global navigation satellite system (GNSS). The GNSS may include at least one of, for example, the global positioning system (GPS), the global navigation satellite system (Glonass), the Beidou navigation satellite system (Beidou), Galileo, and the European global satellite-based navigation system, depending on the usage area or the bandwidth. Herein, the term "GPS" may be used interchangeably with the term "GNSS". Wired communication may use at least one of, for example, Universal Serial Bus (USB), High Definition Multimedia Interface (HDMI), Recommended Standard 232 (RS-232), and Plain Old Telephone Service (POTS). The network 162 may be a telecommunications network, such as a computer network (e.g., local area network (LAN) or wide area network (WAN)), the Internet, or a telephone network.

The first external electronic device 102 and the second external electronic device 104 may be of a type identical to or different from that of the electronic device 101. In one embodiment, the server 106 may be a group of one or more servers. In various embodiments, all or some of the operations executed in the electronic device 101 may be executed in one or more other electronic devices (e.g., electronic devices 102 and 104 or server 106). In one embodiment, to perform a certain function or service automatically or upon request, the electronic device 101 may, instead of or in addition to executing the function or service, request external electronic devices (e.g., electronic device 102 or 104, or server 106) to execute at least some of the function. The external electronic devices (e.g., electronic device 102 or 104, or server 106) may execute the requested function or an additional function, and return the results to the electronic device 101. The electronic device 101 may further process the received results if necessary and provide the requested function or service. To this end, technologies such as cloud computing, distributed computing, and client-server computing may be used.

Figure 2:
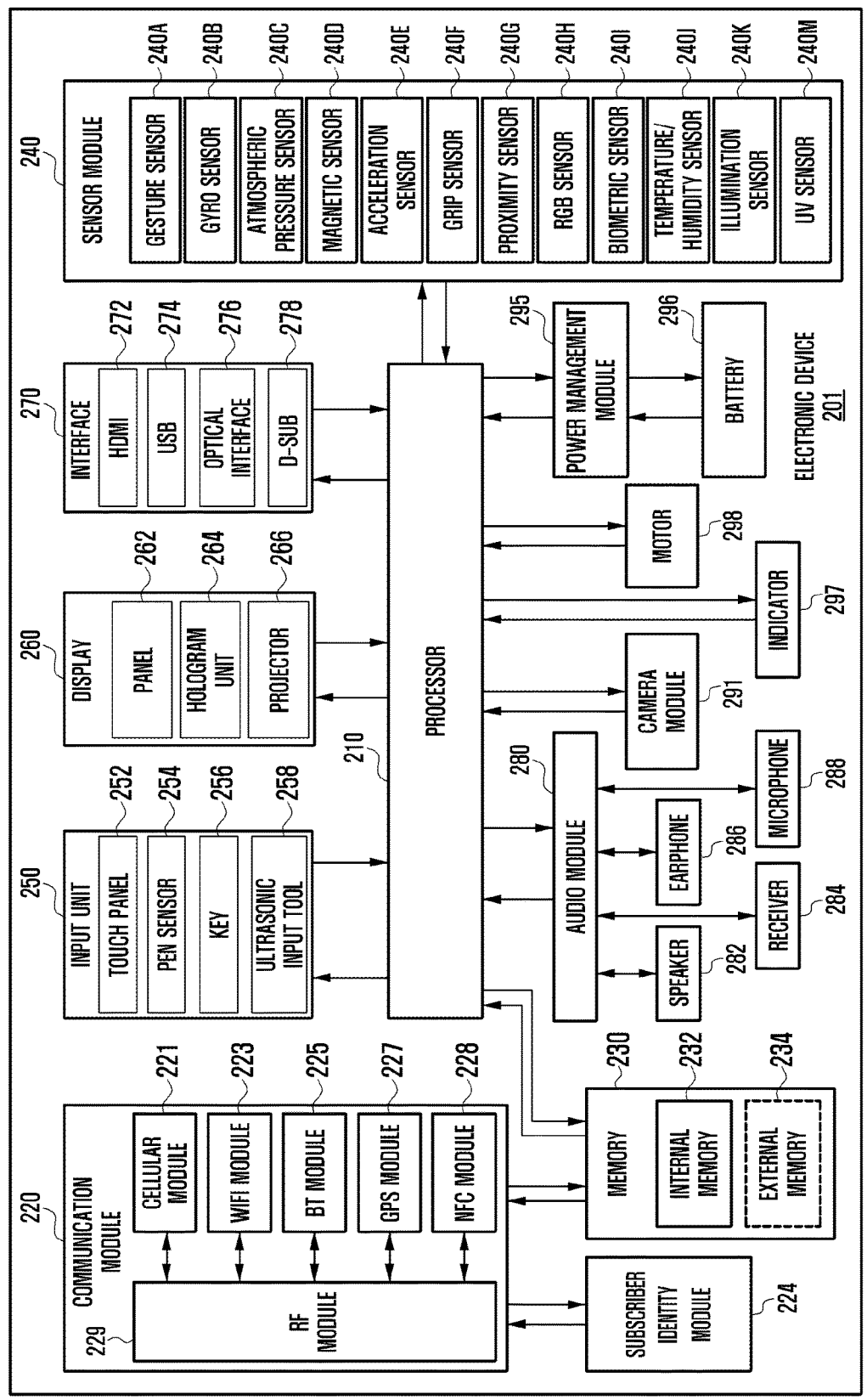
FIG. 2 is a block diagram of an electronic device according to various embodiments of the present invention.

FIG. 2 is a block diagram of an electronic device 201 according to various embodiments. The electronic device 201 may include all or some of the elements of, for example, the electronic device 101 shown in FIG. 1. The electronic device 201 may include at least one processor 210 (e.g., application processor), a communication module 220, a subscriber identification module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software components connected thereto, process various pieces of data, and perform calculations by executing, for example, the operating system or application programs. The processor 210 may be implemented as, for example, a system on chip (SoC). In one embodiment, the processor 210 may further include a graphics processing unit (GPU) and/or an image signal processor. The processor 210 may include at least some (e.g., cellular module 221) of the elements illustrated in FIG. 2. The processor 210 may load instructions or data received from at least one component (e.g., non-volatile memory) onto the volatile memory for execution and may store various data in the non-volatile memory.

The communication module 220 may have a configuration identical or similar to that of the communication interface 170 of FIG. 1. The communication module 220 may include, for example, a cellular module 221, a Wi-Fi module 223, a Bluetooth module 225, a GNSS module 227 (e.g., GPS module, Glonass module, Beidou module, or Galileo module), an NFC module 228, and a radio frequency (RF) module 229.

The cellular module 221 may provide a voice call service, a video call service, a text message service, or an Internet service through, for example, a communication network. In one embodiment, the cellular module 221 may identify and authenticate the electronic device 201 within the communication network by use of the subscriber identification module 224 (e.g., SIM card). In one embodiment, the cellular module 221 may perform at least some of the functions provided by the processor 210. In one embodiment, the cellular module 221 may include a communication processor (CP).

The Wi-Fi module 223, the Bluetooth module 225, the GNSS module 227, and the NFC module 228 may each include a processor to process data transmitted and received through the corresponding module. In one embodiment, at least some (e.g., two or more) of the cellular module 221, the Wi-Fi module 223, the Bluetooth module 225, the GNSS module 227, and the NFC module 228 may be included in one integrated chip (IC) or IC package.

The RF module 229 may transmit and receive a communication signal (e.g., RF signal). The RF module 229 may include a transceiver, a power amp module (PAM), a frequency filter, a low noise amplifier (LNA), an antenna, and the like. In another embodiment, at least one of the cellular module 221, the Wi-Fi module 223, the Bluetooth module 225, the GNSS module 227, and the NFC module 228 may transmit and receive an RF signal through a separate RF module.

The subscriber identification module 224 may include a SIM card and/or an embedded SIM and may store unique identification information (e.g., integrated circuit card identifier (ICCID)) or subscriber information (e.g., international mobile subscriber identity (IMSI)).

The memory 230 (e.g., memory 130) may include, for example, an internal memory 232 and an external memory 234. The internal memory 232 may include at least one of a volatile memory (e.g., dynamic random access memory (DRAM), static RAM (SRAM), or synchronous DRAM (SDRAM)), a non-volatile memory (e.g., one-time programmable read only memory (OTPROM), programmable ROM (PROM), erasable and programmable ROM (EPROM), electrically erasable and programmable ROM (EEPROM), mask ROM, flash ROM, or flash memory such as NAND flash or NOR flash), a hard disk drive, and a solid state drive (SSD).

The external memory 234 may include a flash drive such as compact flash (CF), secure digital (SD), micro-SD, mini-SD, extreme digital (xD), or multi-media card (MMC) and may further include a memory stick or the like. The external memory 234 may be functionally and/or physically connected to the electronic device 201 through various interfaces.

The sensor module 240 may measure a physical quantity or sense the operation state of the electronic device 201 and convert the measured or sensed result into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control one or more sensors included therein. In one embodiment, the electronic device 201 may further include a processor configured to control the sensor module 240 as a part of the processor 210 or a separate entity, and the processor may control the sensor module 240 while the processor 210 is in the sleep state.

The input unit 250 may include, for example, a touch panel 252, a (digital) pen sensor 254, a key 256, and an ultrasonic input tool 258. The touch panel 252 may use at least one of, for example, a capacitive technique, a resistive technique, an infrared technique, and an ultrasonic technique. The touch panel 252 may further include a control circuit. The touch panel 252 may further include a tactile layer to provide a tactile response to the user.

The (digital) pen sensor 254 may include a recognition sheet as a part of the touch panel or a separate entity. The key 256 may include, for example, a physical button, an optical key, or a keypad. The ultrasonic input tool 258 may identify data corresponding to an ultrasonic wave that is generated by an input means and sensed by a microphone (e.g., microphone 288).

The display 260 (e.g., display 160) may include a panel 262, a hologram unit 264, and a projector 266. The panel 262 may have a configuration identical or similar to that of the display 160 of FIG. 1. The panel 262 may be implemented to be, for example, flexible, transparent, or wearable. The panel 262 and the touch panel 252 may be implemented as a single module. The hologram unit 264 may present three dimensional images in the air by using interference of light. The projector 266 may display an image by projecting light onto a screen. The screen may be located inside or outside the electronic device 201. In one embodiment, the display 260 may further include a control circuit to control the panel 262, the hologram unit 264, or the projector 266.

The interface 270 may include, for example, a high definition multimedia interface (HDMI) 272, a universal serial bus (USB) 274, an optical interface 276, and a D-subminiature (D-sub) 278. The interface 270 may be included in, for example, the communication interface 170 of FIG. 1. The interface 270 may additionally or alternatively include a mobile high-definition link (MHL) interface, a secure digital (SD) card/multimedia card (MMC) interface, or an infrared data association (IrDA) standard interface.

The audio module 280 may convert a sound into an electrical signal or vice versa, for example. At least a part of the audio module 280 may be included in, e.g., the input/output interface 150 of FIG. 1. The audio module 280 may process input or output sound information through, for example, the speaker 282, receiver 284, earphone 286, or microphone 288.

The camera module 291 may be used to capture, for example, still and moving images. In one embodiment, the camera module 291 may include one or more image sensors (e.g., front and back sensors), a lens, an image signal processor (ISP), and a flash (e.g., LED or xenon lamp).

The power management module 295 may manage power of the electronic device 201. In one embodiment, the power management module 295 may include a power management integrated circuit (PMIC), a charger IC, and a battery or fuel gauge. The PMIC may use wired and/or wireless charging. Wireless charging may employ, for example, a magnetic resonance scheme, a magnetic induction scheme, or an electromagnetic wave based scheme and may further employ a supplementary circuit for wireless charging, such as a coil loop, a resonance circuit, or a rectifier. The battery gauge may measure, e.g., the remaining power, voltage, current, or temperature of the battery 296 while the battery 296 is being charged. The battery 296 may include, for example, a rechargeable battery and/or a solar battery.

The indicator 297 may indicate a specific state of the electronic device 201 or a part thereof (e.g., processor 210), such as a booting state, message state, or charging state. The motor 298 may convert an electrical signal to a mechanical vibration to generate vibrations or haptic effects. Although not shown, the electronic device 201 may include a processor for supporting mobile TV (e.g., GPU). The processor for mobile TV may process media data conforming to the standard such as digital multimedia broadcasting (DMB), digital video broadcasting (DVB), or MediaFlo™.

In one embodiment, the electronic device 201 (e.g., auditory device) may have a configuration in which some of the components shown in FIG. 2 are omitted.

Each component of the electronic device described above may be composed of one or more elements, and component names may be varied according to the type of the electronic device. In various embodiments, the electronic device may be configured to include at least one of the aforementioned components, and an existing component may be omitted and a new component may be added. In various embodiments, some of the components of the electronic device may be combined into one entity while maintaining the same functionality.

Figure 3:
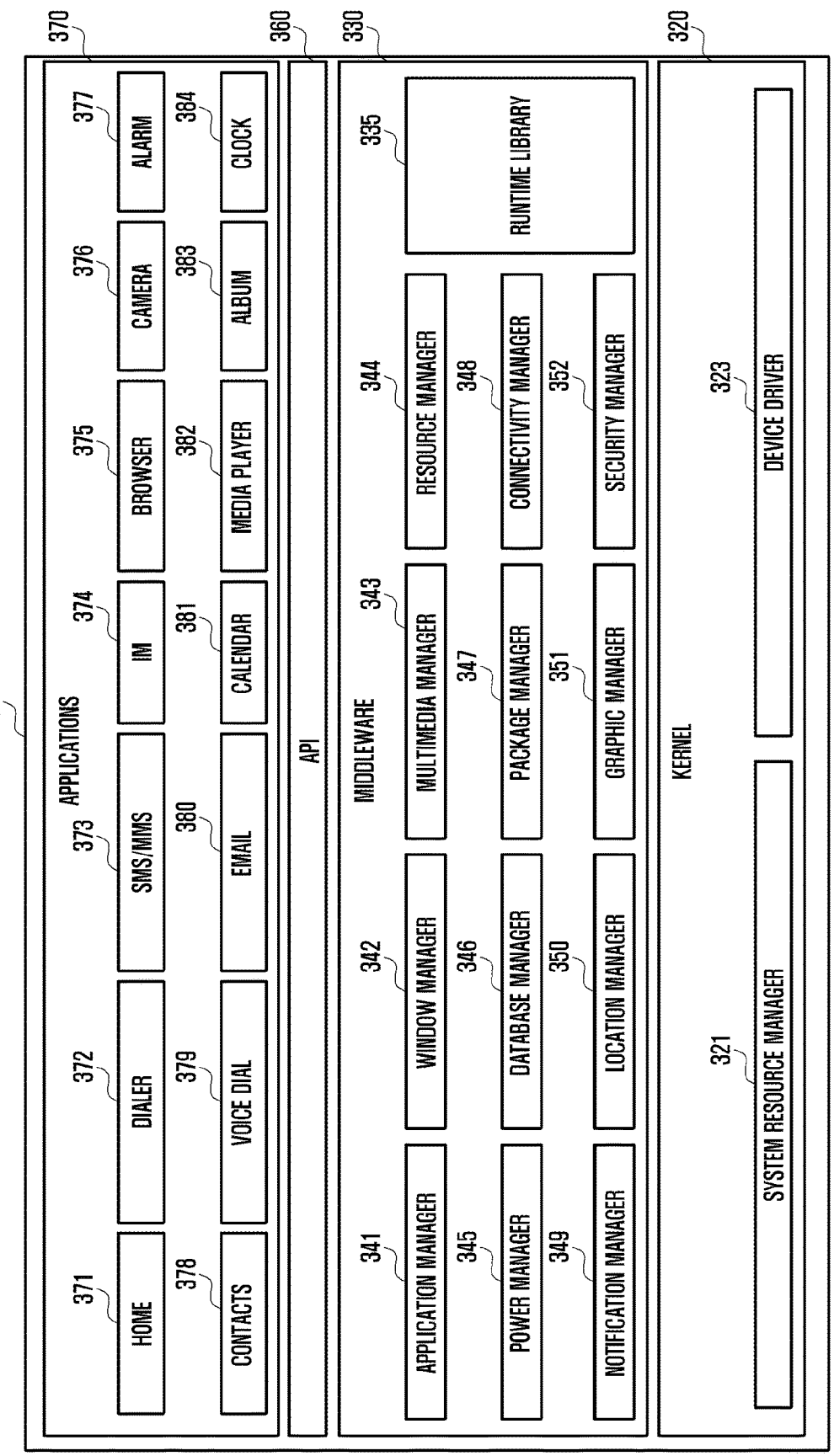
FIG. 3 is a block diagram of program modules according to various embodiments of the present invention.

FIG. 3 is a block diagram of program modules according to various embodiments. In one embodiment, the program modules 310 (e.g., programs 140) may include an operating system (OS) for controlling resources related to the electronic device (e.g., electronic device 101) and/or various applications (e.g., application programs 147) running on the operating system. The operating system may be, for example, Android, iOS, Windows, Symbian, Tizen, or Bada.

The program modules 310 may be composed of a kernel 320, middleware 330, an application programming interface (API) 360, and/or applications 370. At least some of the program modules 310 may be preloaded on the electronic device or may be downloaded from an external electronic device (e.g., electronic device 102 or 104, or server 106).

The kernel 320 (e.g., kernel 141) may include, for example, a system resource manager 321 and/or a device driver 323. The system resource manager 321 may control, allocate, or reclaim system resources. In one embodiment, the system resource manager 321 may include a process manager, a memory manager, and a file system manager. The device driver 323 may include, for example, a display driver, a camera driver, a Bluetooth driver, a shared memory driver, a USB driver, a keypad driver, a Wi-Fi driver, an audio driver, and an inter-process communication (IPC) driver.

The middleware 330 may provide functions commonly needed by the applications 370 or may provide various functions to the applications 370 through the API 360 so that the applications 370 can efficiently use limited system resources in the electronic device. In one embodiment, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include library modules that can be used by a compiler to add a new function through a programming language during application execution. The runtime library 335 may perform functions for input/output management, memory management, or arithmetic operations.

The application manager 341 may manage the life cycle of at least one application among the applications 370. The window manager 342 may manage GUI resources used for the screen. The multimedia manager 343 may identify the format of a media file to be played back and perform encoding and decoding of the media file using a codec matching the identified format. The resource manager 344 may manage resources, such as source code, memory space, and storage space, needed by at least one of the applications 370.

The power manager 345 may operate in cooperation with, for example, the basic input/output system (BIOS) to manage the power source such as the battery and provide power information needed for operation of the electronic device. The database manager 346 may permit at least one of the applications 370 to create, search, and update a database. The package manager 347 may manage installation and update of an application distributed in a package file format.

The connectivity manager 348 may manage wireless links based on, for example, Wi-Fi or Bluetooth. The notification manager 349 may notify the user of events such as message reception, appointment arrival, and proximity in a non-disruptive manner. The location manager 350 may manage location information of the electronic device. The graphics manager 351 may manage graphical effects and related user interfaces for the user. The security manager 352 may provide various security functions needed for system security or user authentication. In one embodiment, when the electronic device (e.g., electronic device 101) supports a telephony function, the middleware 330 may further include a telephony manager to manage voice or video call functions of the electronic device.

The middleware 330 may include a middleware module to form a combination of various functions of the above-described components. To provide differentiated functions, the middleware 330 may provide modules adapted to the types of operating systems. The middleware 330 may delete an existing component or add a new component in a dynamic manner.

The API 360 (e.g., API 145) is a set of API functions for programming and may be configured differently according to the operating system. For example, Android and iOS may provide one API set for each platform, and Tizen may provide two or more API sets for each platform.

The applications 370 (e.g., application programs 147) may include, for example, a home 371, a dialer 372, an SMS/MMS application 373, an instant messenger (IM) 374, a browser 375, a camera application 376, an alarm 377, contacts 378, a voice dialer 379, an email application 380, a calendar application 381, a media player 382, an album application 383, and a clock application 384; and they may further include, for example, a health-care application (e.g., measuring the workout quantity or blood sugar) and an environmental information application (e.g., providing information on the atmospheric pressure, humidity, or temperature).

In one embodiment, the applications 370 may include an application supporting information exchange between the electronic device (e.g., electronic device 101) and an external electronic device (e.g., electronic device 102 or 104) (referred to as "information exchange application" for ease of description). The information exchange application may include, for example, a notification relay application for sending specific information to an external electronic device and a device management application for managing external electronic devices.

For example, the notification relay application may have a function for delivering notification information generated from other applications (e.g., SMS/MMS application, email application, health-care application, or environmental information application) to an external electronic device (e.g., electronic device 102 or 104). The notification relay application may also receive notification information from an external electronic device and deliver the same to the user.

The device management application may manage at least one function (e.g., device or component turn-on/off, display brightness or resolution adjustment) of an external electronic device (e.g., electronic device 102 or 104) communicating with the electronic device, manage (e.g., install, uninstall, or update) an application running on the external electronic device, or manage a service (e.g., call or message service) provided by the external electronic device.

In one embodiment, the applications 370 may include an application designated according to an attribute (e.g., health-care application of a mobile medical appliance) of an external electronic device (e.g., electronic device 102 or 104). In one embodiment, the applications 370 may include an application received from an external electronic device (e.g., server 106, electronic device 102 or 104). In one embodiment, the applications 370 may include a preloaded application or a third party application downloadable from a server. Component names of the program modules 310 may be varied according to the type of operating system.

In various embodiments, at least some of the program modules 310 may be implemented in software, firmware, hardware, or a combination thereof. At least some of the program modules 310 may be implemented (e.g., executed) by a processor (e.g., processor 210). At least some of the program modules 310 may include, for example, a module, a program, a routine, a set of instructions, or a process supporting one or more functions.

In various embodiments, the electronic device, the first external electronic device, and the second external electronic device described below may include all or some of the components of the electronic device 101, 201, or 310 shown in FIGS. 1 to 3.

Figure 4:
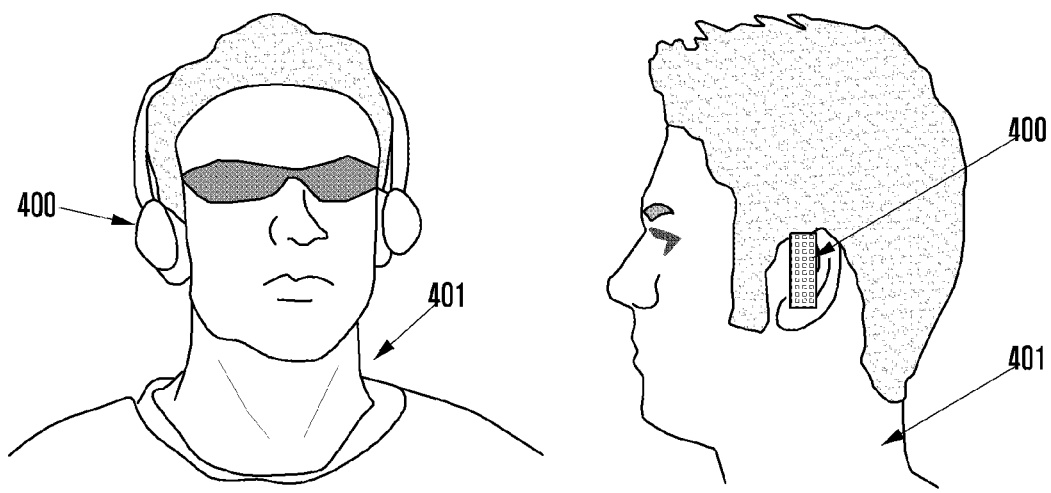
FIG. 4 illustrates usage of the electronic device according to various embodiments of the present invention.

FIG. 4 illustrates usage of the electronic device 400 according to various embodiments of the present invention.

The electronic device 400 (e.g., auditory device) may provide sound information to the user 401. For example, when the user 401 listens to music, makes a telephone call, or talks, the electronic device 400 may amplify surrounding sound information and provide it to the user 401. The electronic device 400 may be worn on a body part of the user 401 so that the receiver (e.g., speaker) of the electronic device 400 may provide sound information near the ear of the user 401. The electronic device 400 may take various forms and provide various functions according to the use or purpose of the user 401. For example, the electronic device 400 may be a headset, a headphone, an earpiece, a hearing aid, or a personal sound amplification product. There are various types of hearing aids such as behind-the-ear hearing aids (BTE), receiver-in-canal hearing aids (RIC), in-the-ear hearing aids (ITE), in-the-canal hearing aids (ITC), and completely-in-canal hearing aids (CIC).

Figure 5:
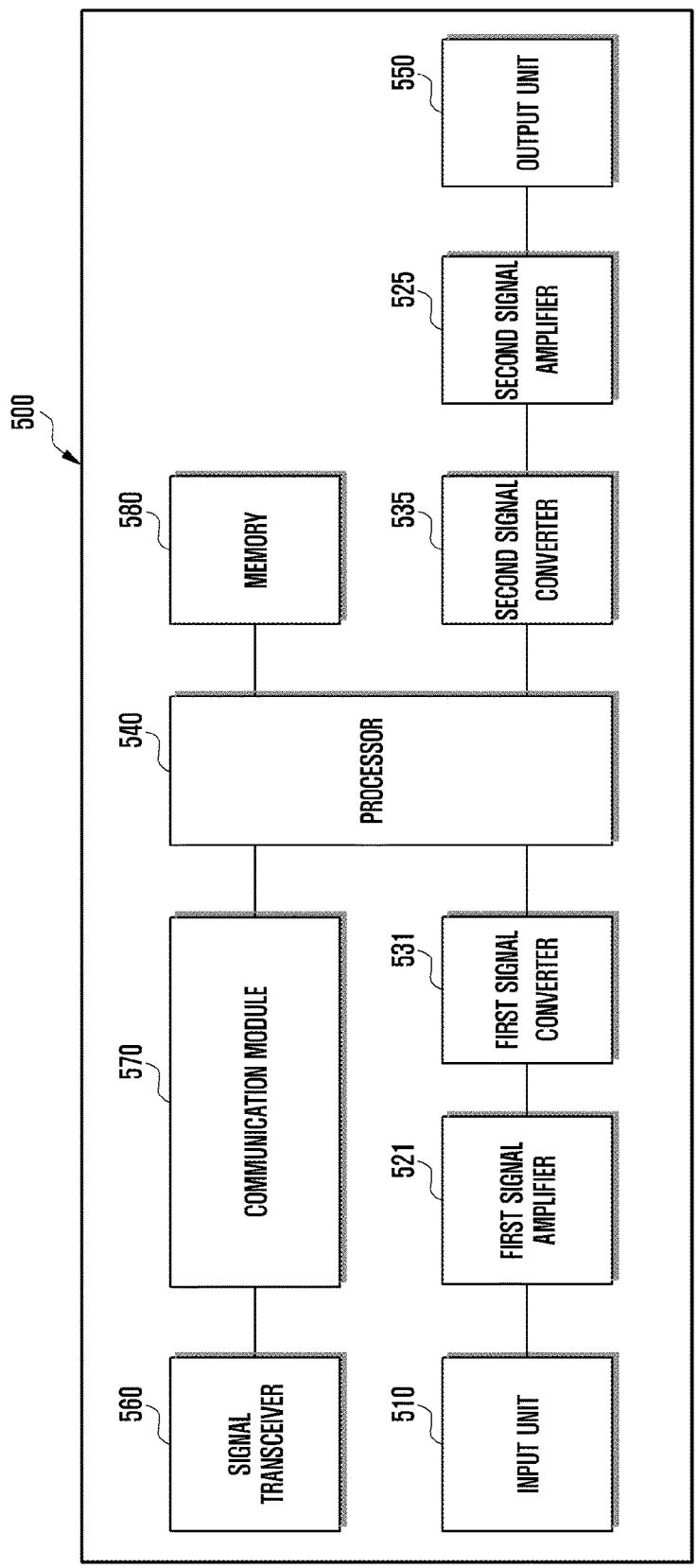
FIG. 5 is a block diagram of the electronic device according to various embodiments of the present invention.

FIG. 5 is a block diagram of the electronic device 500 according to various embodiments of the present invention.

In one embodiment, the electronic device 500 may have components identical or similar to those of the electronic device 101 or 201 shown in FIG. 1 or 2. For example, the electronic device 500 may include all or some of the components of the electronic device 101 or 201 shown in FIG. 1 or 2.

The electronic device 500 may include an input unit 510 (e.g., microphone), signal amplifiers 521 and 525, signal converters 531 and 535, a processor 540, an output unit 550 (e.g., receiver or speaker), a signal transceiver 560, a communication module 570, and a memory 580.

The electronic device 500 may obtain sound information through the input unit 510. For example, the input unit 510 may receive a sound around the electronic device 500 and generate an input signal. In one embodiment, the input unit 510 may include at least one microphone.

The electronic device 500 may further include signal amplifiers 521 and 525 (e.g., amplifier (AMP)). The signal amplifiers 521 and 525 can amplify analog signals. In one embodiment, the signal amplifiers 521 and 525 may include a first signal amplifier 521 (e.g. pre-AMP) for amplifying a signal input through the input unit 510, and a second signal amplifier 525 (e.g., power AMP) for amplifying a signal processed by the processor 540 and transmitting the amplified signal to the output unit.

The electronic device 500 may be wiredly or wirelessly connected to an external electronic device (e.g., mobile device, cellular phone, or tablet) or a network. For example, in the case of a wireless connection, the electronic device 500 may receive an input signal through the signal transceiver 560. In one embodiment, the signal transceiver 560 may include one or more antennas.

The communication module 570 may process the input signal received through the signal transceiver 560 (e.g., audio filtering or signal amplification) and transmit the processed signal to the processor 540.

The processor 540 may process the input signal (e.g., audio filtering or signal amplification) and output a corresponding sound through the output unit. For example, the processor 540 may process an input signal received through the input unit 510 or the communication module 570, and output a corresponding sound through the output unit.

In one embodiment, the processor 540 may apply signal processing (e.g., audio filtering or signal amplification) differently according to the input signal received through the communication module 570 or the input unit 510. The processor 540 may set the signal path (e.g., audio signal path or sound signal path) according to the presence or absence of an input signal through the communication module 570 or the input unit 510. For example, when receiving an input signal through the input unit 510, the processor 540 may set the signal path of the input unit 510 to be directed to the output unit for sound output. When receiving an input signal through the communication module 570, the processor 540 may set the signal path of the communication module 570 to be directed to the output unit. For example, the processor 540 may perform signal path switching between the signal path through the input unit 510 and the signal path through the communication module according to the manner of receiving the input signal.

For example, the processor 540 may measure the power level for each time interval to determine the presence or absence of an input signal through the input unit 510. In one embodiment, when an input signal is present, the processor 540 may analyze the input signal and determine the mode to be activated. For instance, the processor may determine whether the input signal is a signal from the user, a signal from a thing, or a signal similar to that registered on the database (DB). In one embodiment, the processor 540 may change the mode of the electronic device 500 according to the characteristics of the input signal. For example, upon determining that the input signal is noise, the electronic device 500 may remove the input signal (i.e., noise). As another example, if an input signal whose power level is higher than a given threshold is not present for a preset time duration, the processor 540 may operate at least a part of the electronic device 500 in the low-power mode.

In one embodiment, the electronic device 500 may include signal converters 531 and 535. For example, the signal converters 531 and 535 may include a first signal converter 531 (e.g., analog-digital converter (ADC)) for converting an analog signal input through the input unit 510 into a digital signal, and a second signal converter 535 (e.g., digital-analog converter (DAC)) for converting the digital signal into an analog signal to be output through the output unit.

The memory 580 may store information for determining the type of an input signal (e.g., information on the voice of the user, information on the sound or signal of a specific object). The memory 580 may store mode information, function information, and auditory parameters of the electronic device 500. For example, the auditory parameters may include information regarding the noise attenuation quantity, filter values, the pass frequency, the cutoff frequency, the sound amplification value, the directionality, and the user fitting parameters for the electronic device 500.

The memory 580 may store one or more instructions, which are executed by the processor 540 to control the electronic device 500 to perform corresponding functions.

In various embodiments, the electronic device 500 may include all or some of the components of the electronic device 201 shown in FIG. 2. For example, the electronic device 500 may include one or more sensors (e.g., acceleration sensor, gyro sensor, proximity sensor, heart rate sensor, electrocardiogram sensor, pulse sensor). The electronic device 500 may use the sensors to obtain data at least partially related to the physical condition, posture, and/or movement of the user. The electronic device 500 may transmit the obtained data or information extracted from the obtained data to an external device.

Figure 6:
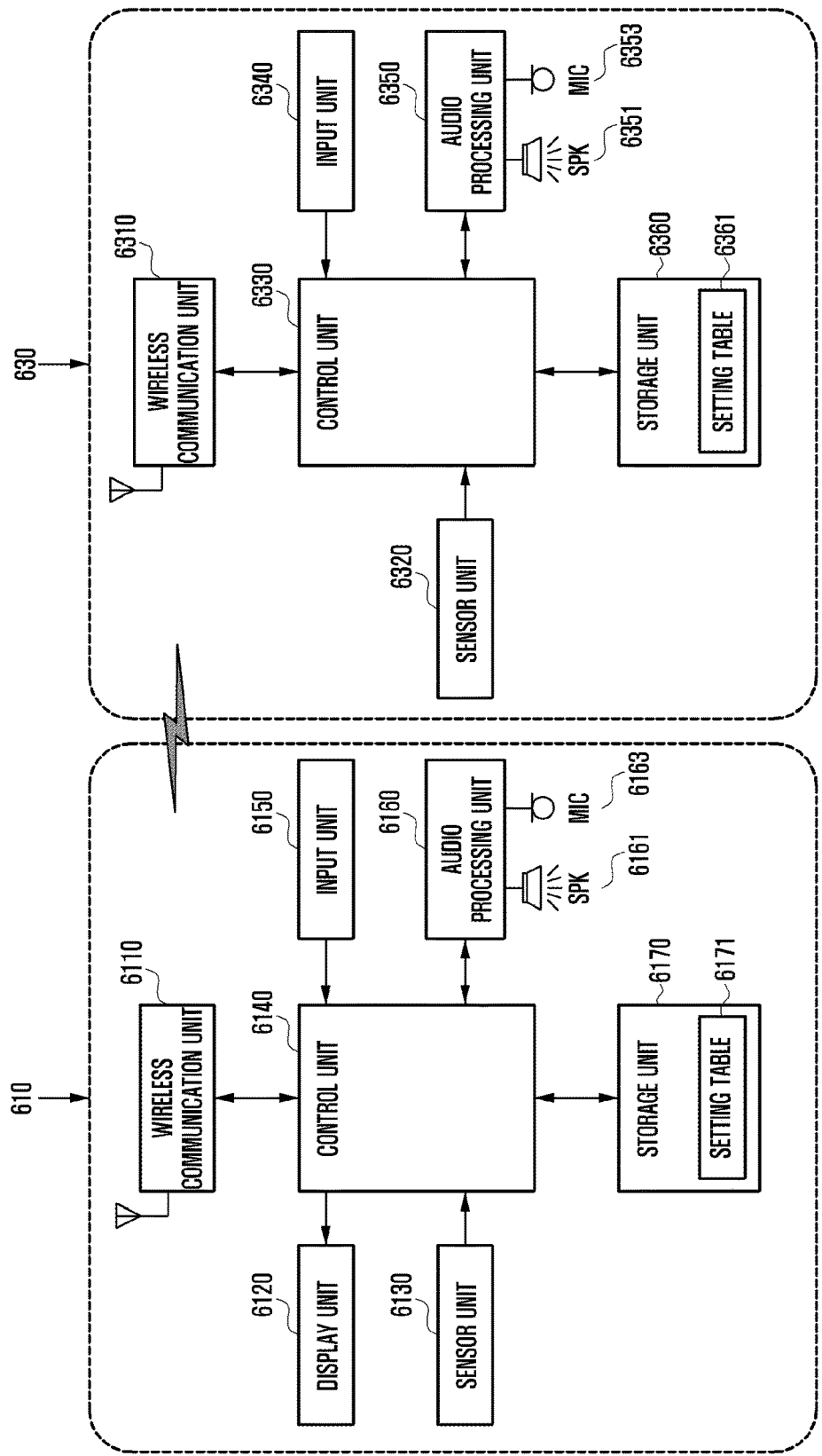
FIG. 6 illustrates an electronic device and an external electronic device according to various embodiments of the present invention.

FIG. 6 illustrates the electronic device 630 and the external electronic device 610 according to various embodiments of the present invention.

In various embodiments, the electronic device 630 and the external electronic device 610 may each include all or some of the components of the electronic device 101 or 201 shown in FIG. 1 or 2.

In one embodiment, the electronic device 630 (e.g., auditory device) may communicate with the external electronic device 610 (e.g., mobile electronic device, cellular phone, or tablet). The electronic device 630 and the external electronic device 610 may be wirelessly paired (e.g., radio frequency (RF), near field magnetic induction (NFMI), Bluetooth, or Audio over Bluetooth Low Energy (AoBLE)). For example, if the external electronic device 610 connected to the electronic device 630 is a mobile terminal, the electronic device 630 may receive sound information related to music playback, a received call, an alarm, or an input signal picked up by the first microphone 6163 from the mobile terminal.

In one embodiment, the electronic device 630 may change the configuration settings thereof via the external electronic device 610. For example, the electronic device 630 may not have a separate display and may include a limited input unit 6340 (e.g., button). The electronic device 630 may be a type of hearing aid and may include multiple filter mode volume settings (e.g. for wide dynamic range compression (WDRC)). In this case, when the user attempts to set the mode or volume of the electronic device 630, the user may feel uncomfortable in checking the configuration state or setting a desired mode through the input unit 6340 (e.g., button or the like). Here, when the electronic device 630 is operated in cooperation with the external electronic device 610, it is possible to easily set or change the mode of the electronic device 630 via the external electronic device 610. For example, when a mobile terminal including various input means (e.g., touch keys or buttons) and a display is used, the mobile terminal may provide a user interface (UI) to the user to control the electronic device 630 and the user can easily change the settings of the electronic device 630 through the provided UI. For instance, the user may change or control the volume of the electronic device 630 by entering a touch input to the mobile terminal without directly manipulating the electronic device 630.

In one embodiment, the electronic device 630 may include a sensor unit 6320. The sensor unit 6320 may include a proximity sensor, an acceleration sensor, a geomagnetic sensor, and a biometric sensor. The electronic device 630 can identify whether it is being worn by the user through the sensor unit 6320. The electronic device 630 may set the power control mode thereof according to whether it is being worn by the user. For example, when the electronic device 630 includes an acceleration sensor, the electronic device 630 may sense the movement of the user through the acceleration sensor, and may operate in the sleep mode if no specific motion is detected.

In one embodiment, the electronic device 630 connected with the external electronic device 610 (e.g., mobile device like a mobile phone or a tablet) may clearly deliver a sound from a remote location to the user. The electronic device 630 can reproduce a sound material stored in the external electronic device 610. The electronic device 630 may convert the received sound information into an audio file or text file and store it in the external electronic device 610. For example, when the first microphone 6163 of the external electronic device 610 is configured as a remote microphone, the electronic device 630 may receive an audio signal from the first microphone 6163 of the external electronic device 610. The audio signal received from the external electronic device 610 may be data compressed through a compression operation. The external electronic device 610 may transmit data to the electronic device 630 via the wireless communication unit 6110 (e.g., antenna). The electronic device 630 may receive the data through the wireless communication unit 6310 (e.g., antenna), extract audio information from the received data according to the data format, decompress the audio information, and output the audio information to the second speaker 6351.

The electronic device 630 may receive an audio signal stored in the external electronic device 610 and reproduce the received audio signal. For example, the external electronic device 610 may store a plurality of notification sounds. The external electronic device 610 may transmit different notification sounds to the auditory device according to the user's situation, the system status, the time, reception of a message, and reception of an e-mail message. The electronic device 630 may receive data from the external electronic device 610, extract audio information from the received data according to the corresponding data format, decompress the audio information, and output the audio information to the second speaker 6351.

The electronic device 630 can record a signal by using the external electronic device 610. The electronic device 630 may compress audio data and store the compressed audio data for effective use of the external electronic device 610. The external electronic device 610 may convert the audio signal into text information using speech-to-text (STT) technology and store the converted text information. For example, the external electronic device 610 can store conversation data exchanged via the electronic device 630 as text using the STT technology. In one embodiment, the external electronic device 610 may add various information such as time information, sensor information, and location information to the stored text data of conversations. The external electronic device 610 can present the stored conversation data on the display. In one embodiment, the external electronic device 610 may convert text information into an audio signal through text-to-speech (TTS) technology and transmit the audio signal to the electronic device 630. The electronic device 630 may output the audio signal received from the external electronic device 610 through the second speaker 6351.

The electronic device 630 may transmit a signal received via the second microphone 6353 to the external electronic device 610. The external electronic device 610 may store the signal received from the electronic device 630. To reduce the power consumed for signal transmission, the electronic device 630 may compress the data to be sent to the external electronic device 610. The electronic device 630 may include a codec to compress and decompress audio data. The external electronic device 610 may receive a signal that has been received via the second microphone 6353 of the electronic device 630, convert the received signal to text data through STT technology, and store the text data. The external electronic device 610 may output the data received from the electronic device 630 or the stored data through the first speaker 6161.

In one embodiment, the electronic device 630 and the external electronic device 610 may provide the user with a call service between remote locations by use of their audio processing units 6350 and 6160 (e.g., the first microphone 6163 and first speaker 6161 of the external electronic device 610, and the second microphone 6353 and second speaker 6351 of the electronic device 630).

In various embodiments, the electronic device 630 may establish a network with additional external electronic devices connected to the external electronic device 610. For example, via the external electronic device 610, the electronic device 630 may exchange data with different electronic devices connected to the external electronic device 610.

In various embodiments, the electronic device 630 or the external electronic device 610 may be one of various electronic devices equipped with a microphone or a speaker including an auditory device or a mobile terminal. For example, the electronic device 630 or the external electronic device 610 may be smart glasses, a head mounted display (HMD), or a robot, which include(s) a plurality of microphones.

Figure 7:
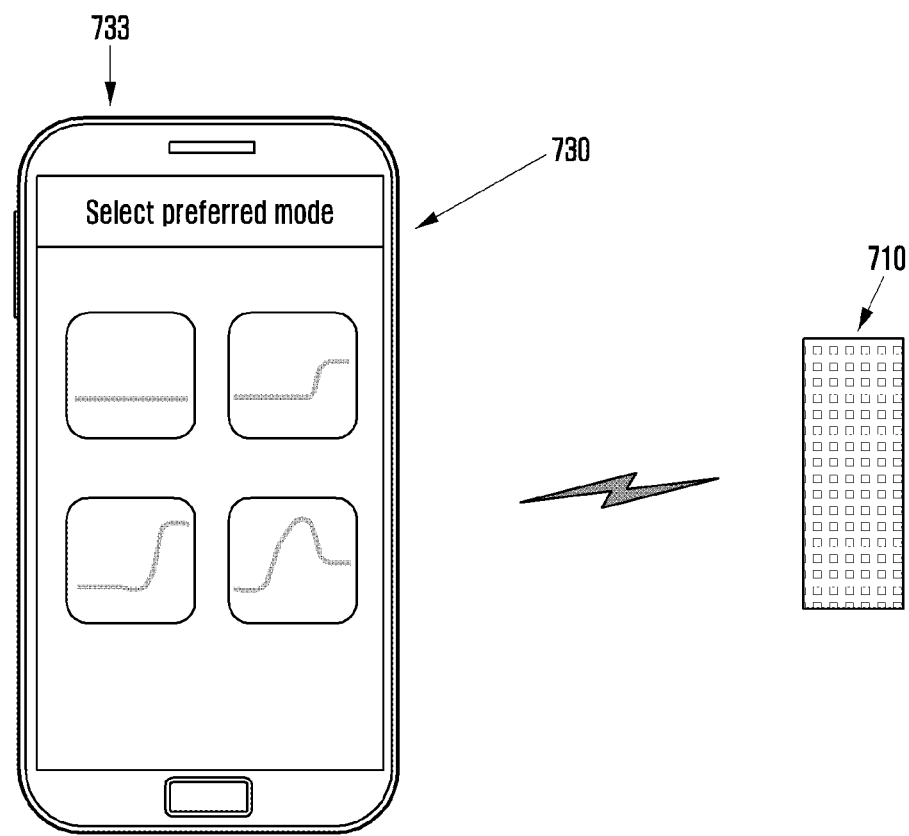
FIG. 7 illustrates cooperation between the electronic device and the external electronic device according to various embodiments of the present invention.

FIG. 7 illustrates cooperation between the electronic device 710 and the external electronic device 730 according to various embodiments of the present invention.

The electronic device 710 can receive a sound from the outside through the microphone. The electronic device 710 may control or change the configuration settings thereof through communication with the external electronic device 730. For example, the external electronic device 730 may store a configuration application of the electronic device 710. The external electronic device 730 can control the mode and volume of the electronic device 710 by use of the configuration application of the electronic device 710. The external electronic device 730 can present a list of configuration modes available to the electronic device 710 on the display. The external electronic device 730 may change the volume or mode of the electronic device 710 according to a user input received via the input unit (e.g., touchscreen). In one embodiment, the external electronic device 730 can set the mode of the electronic device 710 by use of various sensors (e.g., acceleration sensor, gyro sensor, biometric sensor, and proximity sensor) included in the sensor unit. For example, when the user moves the external electronic device 730 left and right or up and down, the external electronic device 730 can sense this movement through the sensor unit. Upon sensing movement, the external electronic device 730 may send an input signal corresponding to the movement to the electronic device 710, so that the electronic device 710 may change the mode correspondingly. As another example, the external electronic device 730 may control the electronic device 710 by using a biometric sensor (e.g., fingerprint sensor) so that the electronic device 710 may change the mode to a configuration state corresponding to the biometric information of the user.

Figure 8:
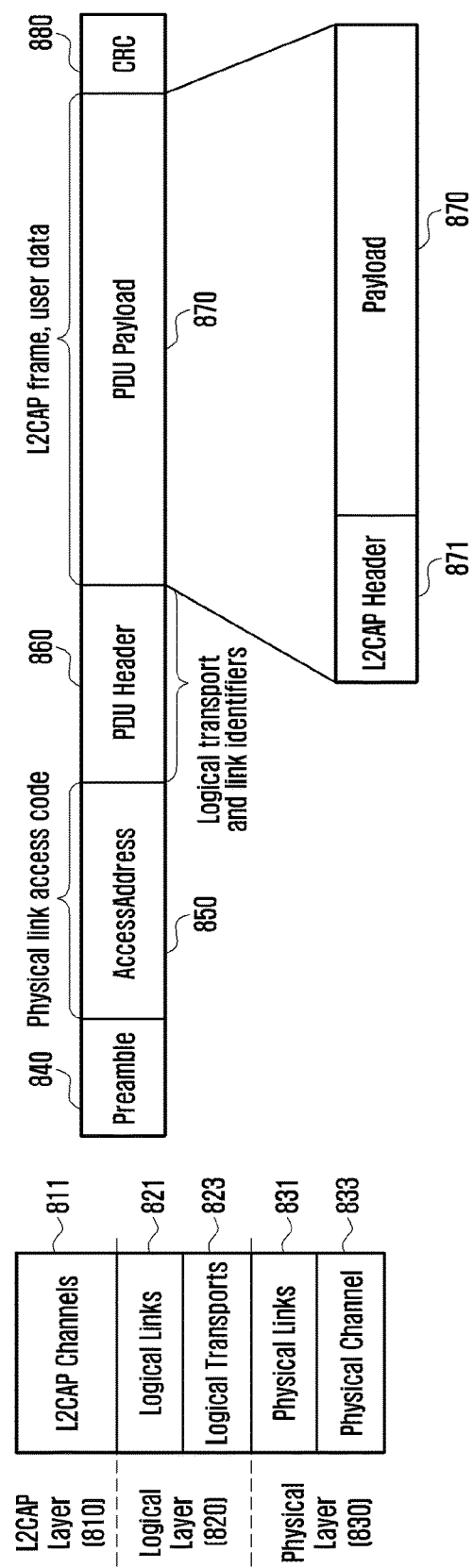
FIG. 8 illustrates a data format used in the electronic device or external electronic device according to various embodiments of the present invention.

FIG. 8 illustrates a data format used in the electronic device 201 or the external electronic device according to various embodiments of the present invention.

In one embodiment, the electronic device 201 (e.g., auditory device) and the external electronic device can communicate using the data format shown in FIG. 8. For example, the electronic device 201 and the external electronic device can communicate wirelessly. The electronic device 201 and the external electronic device can use the BLE (Bluetooth low energy) format as a data format for wireless communication. The electronic device 201 and the external electronic device can use the AoBLE (Audio over BLE) format, which is a modified version of the BLE format, to exchange audio signals during wireless communication.

In one embodiment, the electronic device 201 or the external electronic device may include an L2CAP (logical link control and adaptation protocol) layer 810, a logical layer 820, and a physical layer 830. The L2CAP layer may include L2CAP channels. The logical layer may include logical links 821 and logical transports 823. The physical layer may include physical links 831 and physical channels 833.

In one embodiment, the data format may be composed of a preamble 840, an access address 850, a protocol data unit (PDU) header 860, a PDU payload 870, and a CRC (cyclic redundancy check) 880.

In one embodiment, the access address 850 may include a physical link access code. The PDU header 860 may include logical transport and link identifiers. The PDU payload 870 may include an L2CAP frame and user data. In one embodiment, the PDU payload 870 may include an L2CAP header 871 and a payload 873.

In one embodiment, the PDU payload 870 may carry audio data and setting data, such as the sampling rate, frame size, and activation status of the audio processing unit (e.g., codec), exchanged between the electronic device 201 and the external electronic device. In one embodiment, the L2CAP header of the transmission data format may carry an operation code (OP code) to identify the data type.

Figure 9:
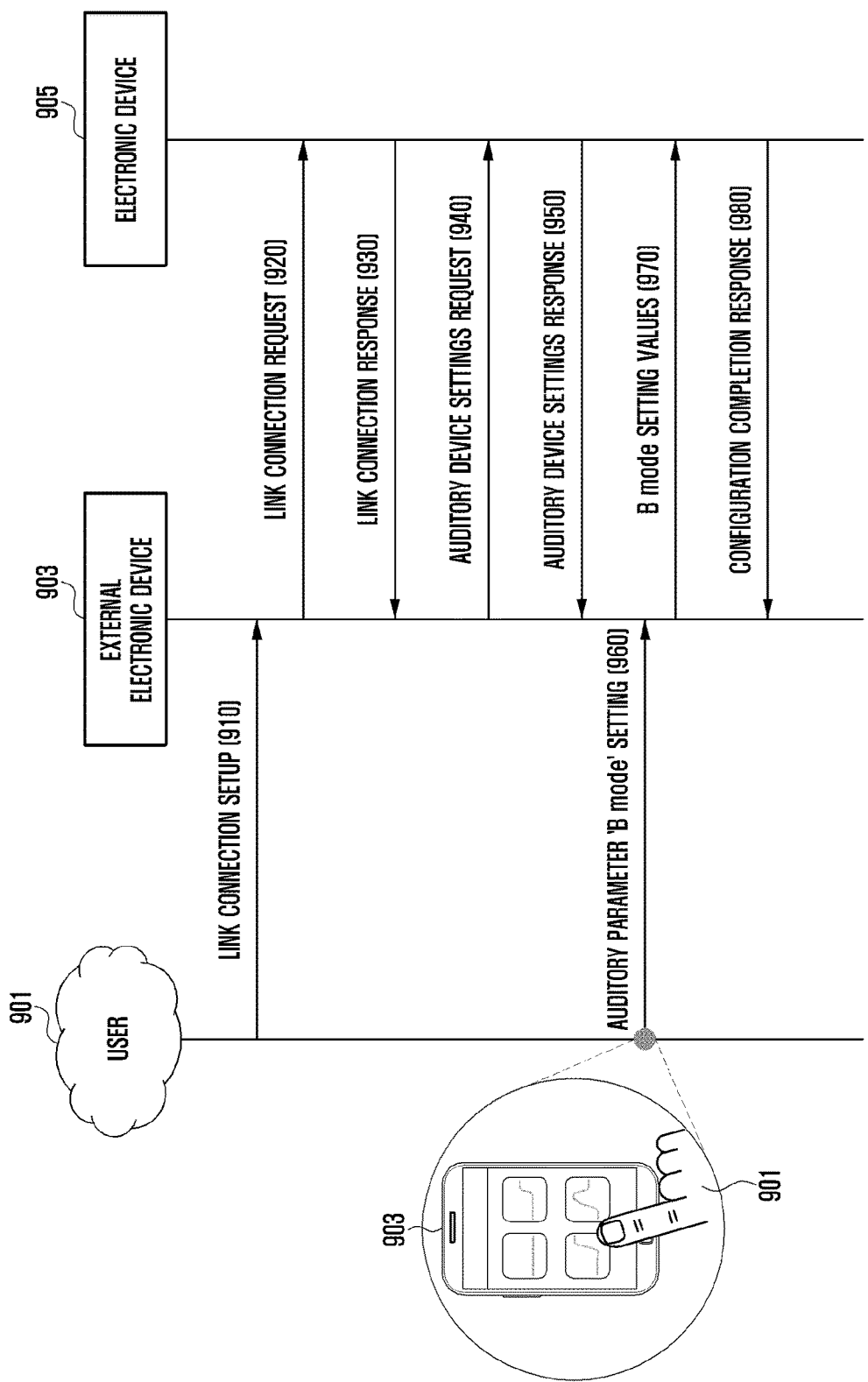
FIG. 9 depicts signal flows between the electronic device and the external electronic device according to various embodiments of the present invention.

FIG. 9 depicts signal flows between the electronic device 905 and the external electronic device 903 according to various embodiments of the present invention.

In one embodiment, the electronic device 905 (e.g., auditory device) can communicate with the external electronic device 903 (e.g., mobile terminal). The electronic device 905 can change the settings by using the external electronic device 903.

At operation 910, the external electronic device 903 may receive an input from the user 901 (e.g., link connection setup) for communication connection with the electronic device 905. For example, the external electronic device 903 may output a list of connectable devices including the electronic device 905 on the display. Upon receiving an input for selecting the electronic device 905 (or another device) from the user 901, the external electronic device 903 may attempt to establish a communication connection with the selected electronic device 905.

At operation 920, the external electronic device 903 may transmit a link connection request to the electronic device 905. For example, the external electronic device 903 may send a link connection request to the electronic device 905 selected according to the input from the user 901.

At operation 930, in reply to the link connection request from the external electronic device 903, the electronic device 905 may transmit a link connection response to the external electronic device 903. In one embodiment, when the link with the electronic device 905 is established, the external electronic device 903 may display a user interface notifying link establishment.

At operation 940, the external electronic device 903 may transmit an information request to the electronic device 905. For example, the external electronic device 903 may request the electronic device 905 to send the setting characteristics. The external electronic device 903 may request the electronic device 905 to send information regarding modes, functions, and settings.

At operation 950, the electronic device 905 may transmit the requested information to the external electronic device 903. For example, the electronic device 905 may send setting information to the external electronic device 903 in reply to the information request from the external electronic device 903.

At operation 960, the external electronic device 903 may receive auditory parameter settings from the user. In one embodiment, the external electronic device 903 may display the mode information or at least one configurable auditory parameter of the electronic device 905. For example, the external electronic device 903 may display setting data or configurable auditory parameter information of the electronic device 905 on the basis of the information received from the electronic device 905. The external electronic device 903 may receive an input from the user 901 for selecting at least one mode or auditory parameter among the displayed modes or auditory parameters.

At operation 970, the external electronic device 903 may transmit the electronic device 905 information on the mode or auditory parameter selected according to the input from the user 901. For example, the external electronic device 903 may send the electronic device 905 a specific mode setting value selected in accordance with the input from the user 901.

At operation 980, the electronic device 905 may transmit a configuration completion response to the external electronic device 903. In one embodiment, the electronic device 905 can update the filter information of the audio processing unit (e.g., codec) on the basis of the auditory parameter or mode setting value received from the external electronic device 903. For example, the electronic device 905 may change the directionality for receiving sound from the outside, filter values for filtering the received sound information, and the cut-off frequency band (or, pass frequency band) according to the received auditory parameter or mode setting value. After changing the settings according to the received setting value, the electronic device 905 may transmit a configuration completion response to the external electronic device 903.

In one embodiment, the electronic device 905 may process sound information received from the outside and output it through the speaker (or receiver) based on the configured mode or auditory parameter.

Figure 10:
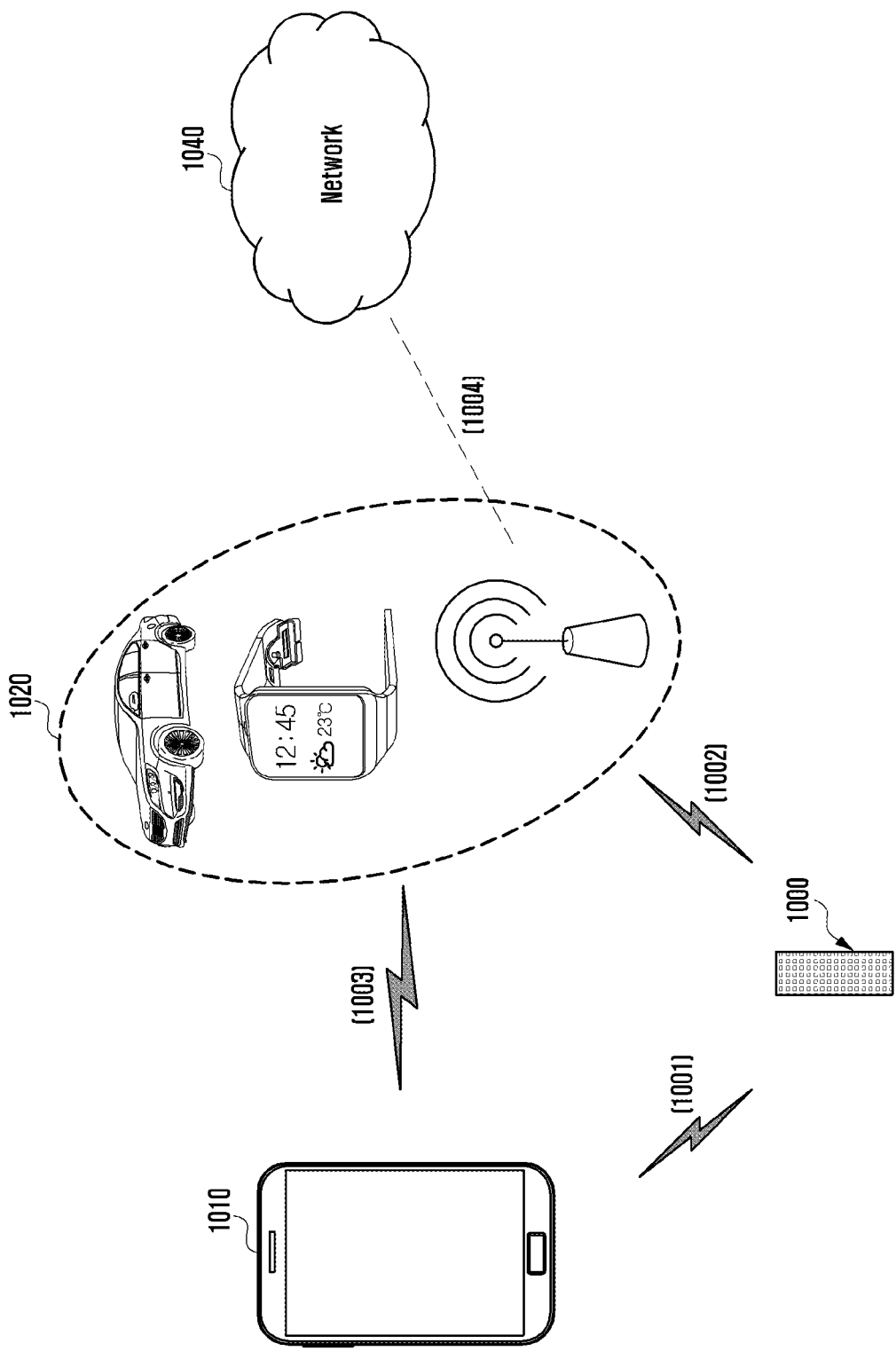
FIG. 10 depicts a situation in which the electronic device communicates with plural external electronic devices according to various embodiments of the present invention.

FIG. 10 depicts a situation in which the electronic device 1000 communicates with plural external electronic devices 1010 and 1020 according to various embodiments of the present invention.

In one embodiment, the electronic device 1000 may communicate with plural external electronic devices (e.g., first external electronic device 1010 and second external electronic device 1020) or the network 1040.

For example, the electronic device 1000 may be connected with the first external electronic device 1010 (first communication 1001). The electronic device 1000 may exchange data with the first external electronic device 1010. For example, the electronic device 1000 may set audio filter information thereof via the first external electronic device 1010. Specifically, the electronic device 1000 may receive an instruction or data for setting the audio filter information from the first external electronic device 1010.

The electronic device 1000 may be connected to the second external electronic device 1020 or the network 1040 via the first external electronic device 1010, and may exchange data with the first external electronic device 1010, the second external electronic device 1020, or the network 1040. For example, the first external electronic device 1010 may be connected with the second external electronic device 1020 (third communication 1003). The second external electronic device 1020 may be connected to the network 1040 (fourth communication 1004). In this case, the electronic device 1000 can transmit and receive data to and from the second external electronic device 1020 or the network 1040 by using the first external electronic device 1010 as a relay terminal. In one embodiment, the electronic device 1000 can exchange data with the second external electronic device 1020 or the network 1040 by using communication protocols provided by the first external electronic device 1010. For example, the electronic device 1000 may establish the first communication 1001 with the first external electronic device 1010 via NFMI or BLE. The first external electronic device 1010 can establish the third communication 1003 with the second external electronic device 1020 or the network 1040 (including the connection via the gateway) via Wi-Fi. The electronic device 1000 may transmit and receive data to and from the first external electronic device 1010 via NFMI or BLE, and the first external electronic device 1010 may transmit data received from the electronic device 1000 to the second external electronic device 1020 or the network 1040 via Wi-Fi and receive data destined for the electronic device 100 from the second external electronic device 1020 or the network 1040 via Wi-Fi. For example, the electronic device 1000 may download fitting (audio filter) data from the network 1040 via the first external electronic device 1010. As another example, the electronic device 1000 can receive audio data information stored in the second external electronic device 1020 via the first external electronic device 1010, and output the received audio data information.

The electronic device 1000 may be connected to the second external electronic device 1020 (second communication 1002). The electronic device 1000 may support a standard for communication with the second external electronic device 1020 or the network 1040. For example, the electronic device 1000 may provide a telephony standard (e.g., 3G or LTE). The electronic device 1000 may be connected to the base station for communication and provide a call service to the user.

According to an embodiment of the present invention, the electronic device may include: at least one microphone configured to pick up a sound from the outside and to sense the direction of the sound; a speaker configured to output a sound; a communication circuit configured to receive audio data from an external electronic device; a processor electrically connected with the at least one microphone, the speaker, and the communication circuit; and at least one memory electrically connected to the processor.

The memory may store instructions that, when executed, cause the processor to: identify the sound direction based on the sound data picked up by the at least one microphone; determine the level of similarity between the received audio data and the sound data picked up by the microphone; and process the sound data to be output through the speaker on the basis of the information about the similarity level and the sound direction.

In one embodiment, the electronic device may further include a housing having a portion configured to be removably attachable to the user's ear. In one embodiment, the at least one microphone, the speaker, the communication circuit, the processor, and the memory may be included in the housing.

In one embodiment, the instructions may cause the processor to adjust the output level of the sound corresponding to the received audio data or the sound corresponding to the picked up sound data among the sound data to be output through the speaker.

In one embodiment, the instructions may cause the processor to: compare the sound direction with a preset reference direction; and process the sound data to be output according to the comparison result.

In one embodiment, the instructions may cause the processor to set information on the reference direction based on the similarity level and the sound direction.

In one embodiment, the instructions may cause the processor to: determine the level of similarity between the received audio data and the sound data picked up by the microphone; and decrease the output level of the sound corresponding to the picked up sound data if the similarity level is higher than or equal to a preset threshold.

In one embodiment, the instructions may cause the processor to increase the output level of the sound corresponding to the picked up sound data if the similarity level is lower than the preset threshold.

In one embodiment, the instructions may cause the processor to output a notification through the speaker or to send the external electronic device a command to output a notification message if the similarity level is lower than the preset threshold.

In one embodiment, the instructions may cause the processor to adjust the output level of the sound corresponding to the received audio data or the sound corresponding to the picked up sound data according to a signal or data received from a second external electronic device.

In one embodiment, the electronic device may further include a sensor configured to sense the state, attitude, or movement of the electronic device.

In one embodiment, the instructions may cause the processor to set the reference direction information at least partially based on the state, attitude, or movement of the electronic device sensed through the sensor.

In one embodiment, the instructions may cause the processor to: extract sound data picked up within a given direction range with respect to the reference direction from the sound data picked up by the microphone; and adjust the output level of the sound corresponding to the extracted sound data.

In one embodiment, the instructions may cause the processor to: identify the direction in which the external electronic device is located based on the signal received from the external electronic device; extract sound data picked up within a given direction range with respect to the direction of the external electronic device from the picked up sound data; and adjust the output level of the sound corresponding to the extracted sound data.

According to an embodiment of the present invention, the auditory device may include: at least one microphone configured to pick up a sound from the outside; a speaker configured to output a sound; a communication circuit configured to receive audio data from an external electronic device; a processor electrically connected with the at least one microphone, the speaker, and the communication circuit; and at least one memory electrically connected to the processor. The memory may store instructions that, when executed, cause the processor to: compare the audio data received through the communication circuit with the sound data picked up by the microphone; output the sound data picked up by the microphone through the speaker as a sound.

In one embodiment, the instructions may cause the processor to: determine the level of similarity between the audio data received through the communication circuit and the sound data picked up by the microphone; and determine the direction of the external electronic device having transmitted the audio data based on the similarity level.

In one embodiment, the instructions may cause the processor to: identify the direction in which the sound picked up by the microphone is received on the basis of the picked up sound data; and adjust the output level of the speaker output sound corresponding to the sound data picked up by the microphone on the basis of the result of comparison between the sound pick-up direction and the direction of the external electronic device.

In one embodiment, the instructions may cause the processor to: decrease the output level of the sound corresponding to the sound data picked up by the microphone if the sound pick-up direction matches the direction of the external electronic device; and increase the output level of the sound corresponding to the sound data picked up by the microphone if the sound pick-up direction does not match the direction of the external electronic device.

In one embodiment, the instructions may cause the processor to output the sound corresponding to the received audio data and the sound corresponding to the sound data picked up by the microphone through the speaker.

In one embodiment, the instructions may cause the processor to: determine the level of similarity between the received audio data and the sound data picked up by the microphone; set the output level of the sound corresponding to the received audio data to be higher than the output level of the sound corresponding to the sound data picked up by the microphone if the similarity level is higher than or equal to a preset threshold; and set the output level of the sound corresponding to the received audio data to be lower than the output level of the sound corresponding to the sound data picked up by the microphone if the similarity level is lower than the preset threshold.

Figure 11:
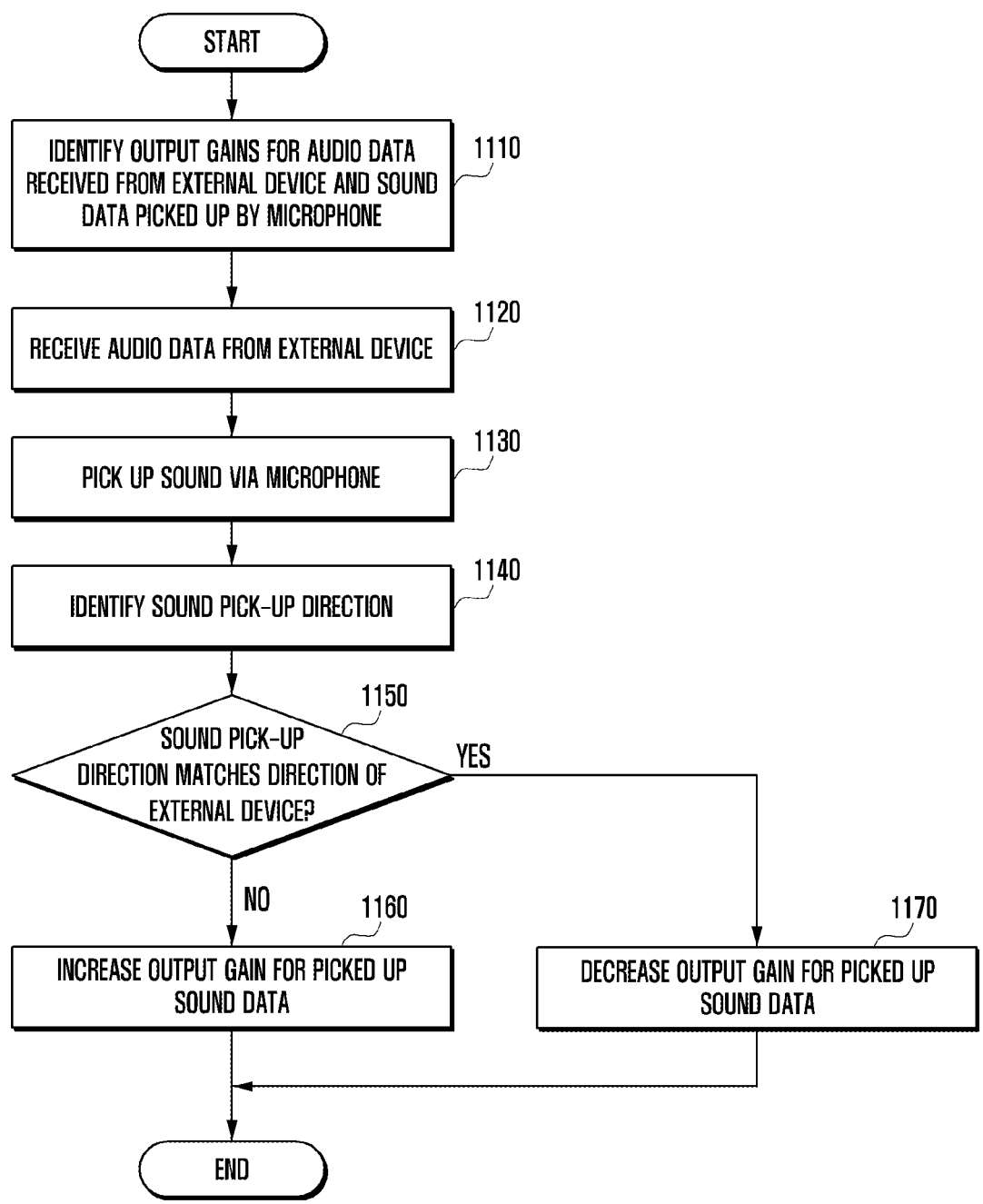
FIG. 11 is a flowchart of an operation control method for the electronic device according to various embodiments of the present invention.

FIG. 11 is a flowchart of an operation control method for the electronic device according to various embodiments of the present invention.

At operation 1110, the electronic device may identify the output gain of each of the audio data received from the external device and the sound data picked up by the microphone. For example, the electronic device may examine the mixing ratio between the received audio data and the sound data picked up by the microphone. The electronic device may examine the output levels of the sound corresponding to the audio data and the sound corresponding to the picked up sound data among the sound data to be output through the speaker. The electronic device may determine which of the sound corresponding to the audio data and the sound corresponding to the picked up sound data will be output louder. For example, the electronic device may output the sound corresponding to the audio data only, output the sound corresponding to the sound data picked up by the microphone only, or mix the sound corresponding to the audio data and the sound corresponding to the sound data picked up by the microphone at a specific ratio and output the mixed sound. The electronic device may examine the output levels set for the received audio data and the picked up sound data or the mixing ratio therebetween.

At operation 1120, the electronic device may receive audio data from the external device. For example, the electronic device can receive a streaming audio signal from the external device. The electronic device may receive audio data from a smart TV or audio equipment through wireless communication.

In one embodiment, after receiving audio data from the external device, the electronic device can output a sound corresponding to the received audio data through the speaker. For example, the electronic device may output a sound corresponding to the received audio data based on the output gain identified at operation 1110.

At operation 1130, the electronic device can pick up a sound from the outside by use of the microphone. For example, the electronic device may pick up a sound from the outside (i.e., from a speaker other than the user). The electronic device may at least temporarily store the picked up sound data in the memory. For example, the electronic device may convert the picked up sound data into digital data and store the digital data in the memory. In one embodiment, the electronic device may include a converter to convert a picked up sound (i.e., analog signal) into a digital signal.

In one embodiment, the electronic device can output a sound corresponding to the sound data picked up by the microphone through the speaker. For example the electronic device may output a sound corresponding to the picked up sound data based on the output gain identified at operation 1110.

At operation 1140, the electronic device may identify the direction in which the sound is picked up. The electronic device can obtain information about the direction in which the sound is picked up from the picked up sound data. For example, the electronic device can pick up a sound by use of one or more microphones. The electronic device can analyze the sound data picked up by a plurality of microphones and identify the direction in which the sound is picked up.

At operation 1150, the electronic device may determine whether the sound pick-up direction matches the direction of the external electronic device. In one embodiment, the electronic device may identify the location or direction of the external device based on a signal received from the external device. For example, the electronic device may identify the direction of the external device based on audio data or a wireless signal received from the external device.

In one embodiment, the electronic device may receive a sound output by the speaker of the external device and identify the direction of the external device based on the received sound. The electronic device may compare the sound pick-up direction with the direction of the external device.

If the sound pick-up direction does not match the direction of the external device, at operation 1160, the electronic device can increase the output gain of the picked up sound data.

For example, when the user of the electronic device (e.g., auditory device) views or listens to the TV or the like (i.e., the electronic device outputs a sound corresponding to an audio signal received from an external device (e.g., TV or audio equipment)), it may be necessary for the user to hear the speech of another person in the vicinity. For example, if the sound picked up by the microphone is not in the direction of the external device, the picked up sound data may be different from the audio data received from the external device (or the sound output by the speaker of the external device).

In one embodiment, if the picked up sound is not in the direction of the external device, the electronic device may increase the output gain of the picked up sound data. For example, the electronic device may increase the output volume of the sound corresponding to the picked up sound data. The electronic device may increase the relative output level of the sound corresponding to the picked up sound data by adjusting the mixing ratio between the received audio data and the picked up sound data. The electronic device may adjust the filter value applied to the sound data to be output through the speaker.

If the sound pick-up direction matches the direction of the external device, at operation 1170, the electronic device can decrease the output gain of the picked up sound data. In one embodiment, when receiving audio data, the electronic device may set the output level of the sound picked up by the microphone to be low. For example, when the electronic device receives audio data from the TV, the user may be watching the TV. At this time, the electronic device may output the audio data received from the TV via wireless communication through the speaker. To prevent a user watching the TV from hearing surrounding noise, the electronic device may not output the sound corresponding to the sound data picked up by the microphone. For example, the audio data received from the TV and the sound output through the TV speaker may be the same. When the electronic device outputs both the audio data received from the TV and the sound corresponding to the sound data picked up by the microphone from the surroundings (i.e., the sound output from the TV speaker), the sound corresponding to the audio data and the sound corresponding to the sound data picked up by the microphone may interfere with each other, causing an echo phenomenon. Hence, when receiving audio data from an external device, the electronic device may not output the sound corresponding to the sound data picked up by the microphone, or may output the sound corresponding to the sound data picked up by the microphone at a low volume.

In various embodiments, the electronic device may perform all or some of the operations shown in FIG. 11 in a different order. For example, the electronic device may perform operation 1110 for identifying the output gain after operation 1120 for receiving the audio data and operation 1130 for picking up sound data.

In various embodiments, the electronic device may adjust the mixing ratio of the sounds to be output through the speaker according to the direction of the sound picked up by the microphone. Hence, while listening to the audio data received from an external device without echoes or noise, the user can hear the ambient sound (e.g., the speech of another person) picked up by the microphone irrespective of the external device.

Figure 12:
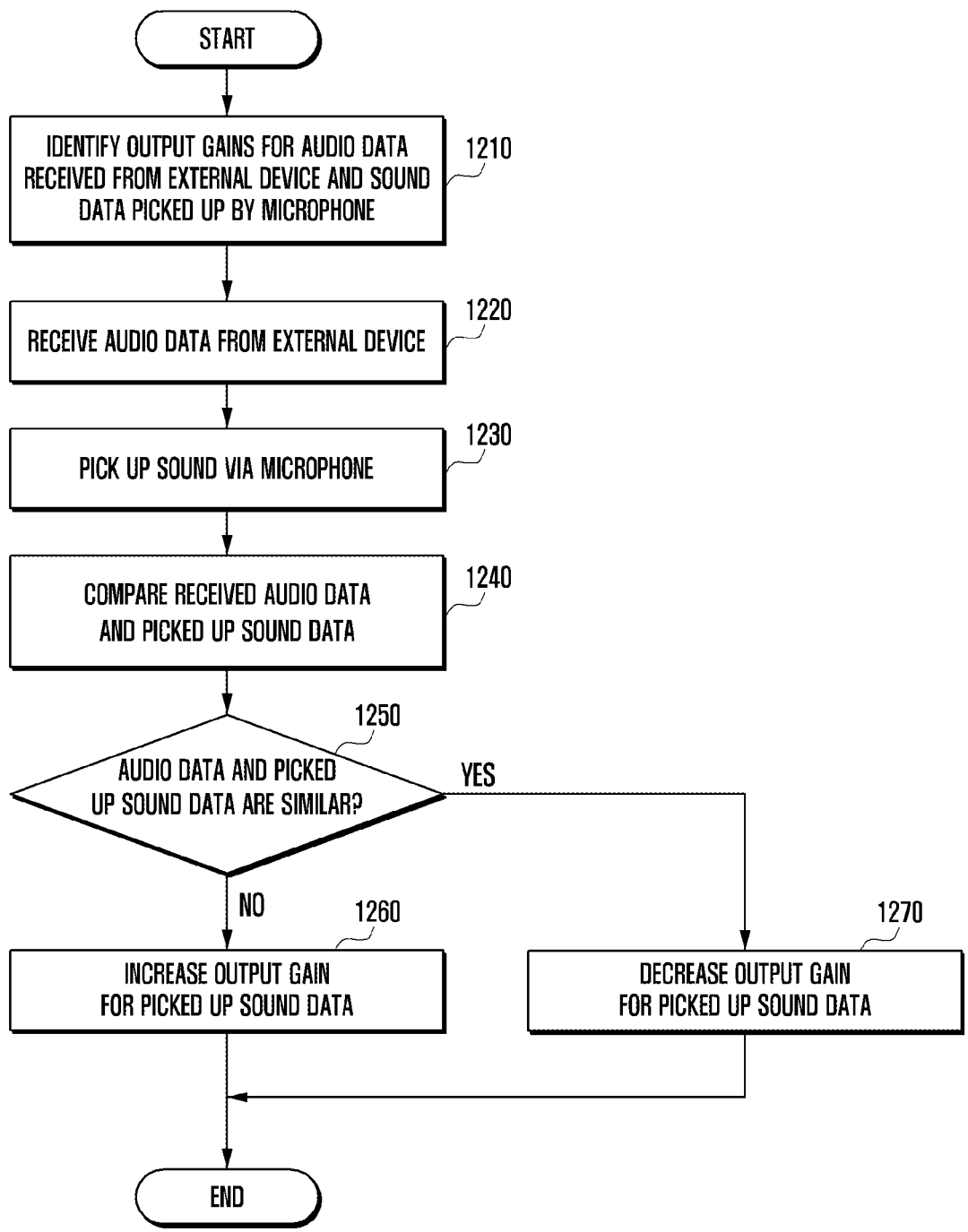
FIG. 12 is a flowchart of an operation control method for the electronic device according to various embodiments of the present invention.

FIG. 12 is a flowchart of an operation control method for the electronic device according to various embodiments of the present invention.

At operation 1210, the electronic device may identify the output gain of each of the audio data received from the external device and the sound data picked up by the microphone. For example, the electronic device can examine the gains for amplifying the received audio data and the picked up sound data to output the sound corresponding to the received audio data and the sound corresponding to the picked up sound data through the speaker. The electronic device may examine the mixing ratio between the received audio data and the sound data picked up by the microphone. The electronic device may examine the output levels of the sound corresponding to the audio data and the sound corresponding to the picked up sound data among the sound data to be output through the speaker. The electronic device may examine the output levels set for the audio data and the picked up sound data or the mixing ratio therebetween.

At operation 1220, the electronic device may receive audio data from the external device. In one embodiment, after receiving audio data from the external device, the electronic device can output a sound corresponding to the received audio data through the speaker.

At operation 1230, the electronic device can pick up a sound from the outside by use of the microphone. In one embodiment, the electronic device may at least temporarily store the picked up sound data in the memory. The electronic device can output a sound corresponding to the sound data picked up by the microphone through the speaker.

At operation 1240, the electronic device may compare the received audio data and the picked up sound data. In one embodiment, for comparison with the received audio data, the electronic device may convert the format of the sound data picked up by the microphone into a format matching the audio data.

For example, the external electronic device may transmit audio data to the electronic device and output the sound corresponding to the audio data through its speaker at the same time. The electronic device may wirelessly receive the audio data from the external electronic device and pick up the sound corresponding to the audio data output by the external electronic device through its microphone at the same time. The electronic device can simultaneously receive audio data and sound data associated with each other. In one embodiment, the electronic device can compare the audio data received from the external electronic device with data obtained by converting sound data picked up by the microphone.

At operation 1250, the electronic device may determine whether the received audio data is similar to the picked up sound data. For example, the electronic device may examine the level of similarity between the received audio data and the picked up sound data. The electronic device may determine whether the received audio data is associated with the picked up sound data. The electronic device may determine whether the received audio data and the picked up sound data are commonly related to the same audio information.

If the received audio data is not similar to the picked up sound data, at operation 1260, the electronic device can increase the output gain of the picked up sound data. For example, the electronic device may increase the output gain of the picked up sound data if the similarity level is lower than a preset threshold.

For example, when the electronic device (e.g., auditory device) outputs a sound corresponding to audio data received from the external device, it may be necessary for the electronic device to provide the user with an external sound (e.g., speech of a person other than the user).

In one embodiment, if the received audio data is not similar to the picked up sound data, the electronic device may increase the output volume of the sound corresponding to the picked up sound data. The electronic device may increase the relative output level of the sound corresponding to the picked up sound data by adjusting the mixing ratio between the received audio data and the picked up sound data.

If the received audio data is similar to the picked up sound data, at operation 1270, the electronic device can decrease the output gain of the picked up sound data. For example, the electronic device may decrease the output gain of the picked up sound data if the similarity level is higher than or equal to the preset threshold.

For example, the audio data received from the TV and the sound output through the TV speaker may be the same. When the electronic device outputs both the audio data received from the TV and the sound corresponding to the sound data picked up by the microphone from the surroundings (i.e., the sound output from the TV speaker), the sound corresponding to the audio data and the sound corresponding to the sound data picked up by the microphone may interfere with each other, causing an echo phenomenon. Hence, when receiving audio data from an external device, the electronic device may not output the sound corresponding to the sound data picked up by the microphone, or may output the sound corresponding to the sound data picked up by the microphone at a low volume.

In various embodiments, the electronic device may perform all or some of the operations shown in FIG. 12 in a different order. For example, the electronic device may perform operation 1210 for identifying the output gain after operation 1220 for receiving the audio data and operation 1230 for picking up sound data.

In various embodiments, the electronic device may adjust the mixing ratio of the sounds to be output through the speaker according to the level of similarity between the audio data received from an external device and the sound data picked up by the microphone. Hence, while listening to the audio data received from the external device without echoes or noise, the user can hear the ambient sound (e.g., the sound other than the sound output by the external device) picked up by the microphone irrespective of the external device.

Figure 13:
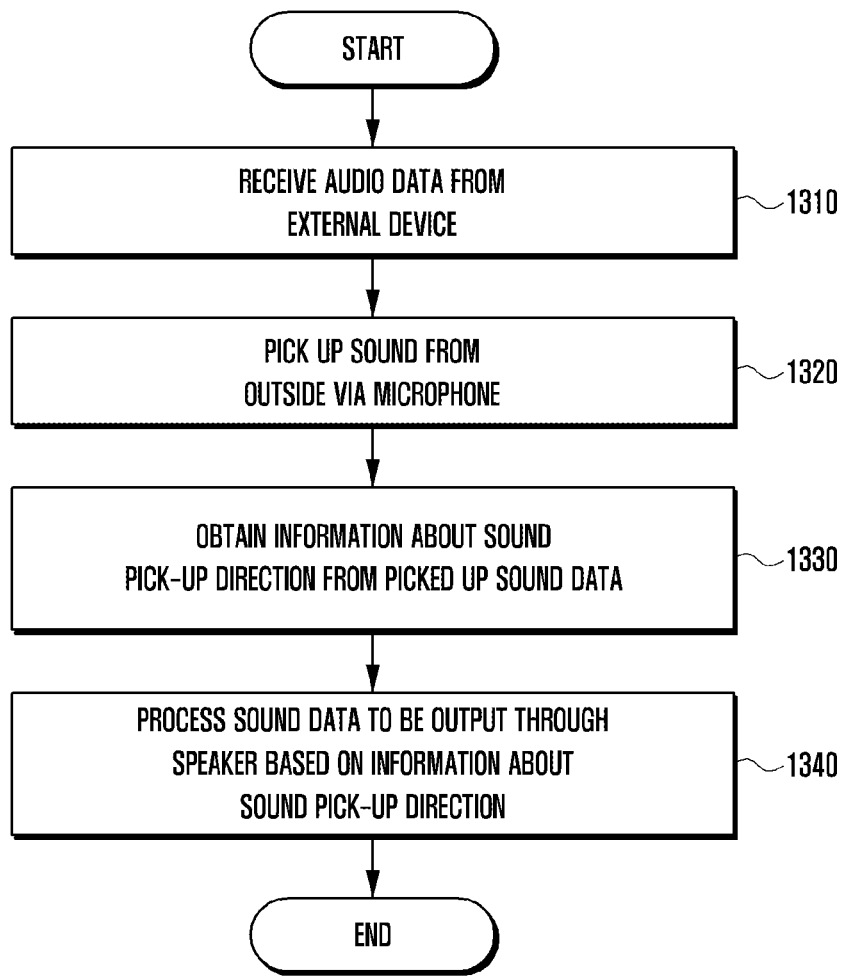
FIG. 13 is a flowchart of an operation control method for the electronic device according to various embodiments of the present invention.

FIG. 13 is a flowchart of an operation control method for the electronic device according to various embodiments of the present invention.

At operation 1310, the electronic device may receive audio data from the external electronic device. For example, the electronic device (e.g., auditory device) may receive audio data from the external electronic device (e.g., smart TV or audio equipment) through wireless communication.

At operation 1320, the electronic device may pick up a sound from the outside by use of the microphone. For example, while receiving audio data from the external electronic device, the electronic device may pick up a sound from the outside through the microphone. The electronic device may at least temporarily store the picked up sound data in the memory.

At operation 1330, the electronic device can obtain information about the direction in which the sound is picked up from the picked up sound data. For example, the electronic device can identify the direction in which the sound is picked up by use of one or more microphones. The electronic device may obtain and store information about the direction in which the sound is picked up from the picked up sound data.

At operation 1340, the electronic device can process sound data to be output through the speaker based on the information about the direction in which the sound is picked up. For example, the electronic device can adjust the mixing ratio of the output sounds based on the information about the sound pick-up direction. The electronic device may adjust the volume mixing ratio between the audio data received from the external electronic device and the sound data picked up by the microphone among the output sounds. For example, if the sound pick-up direction matches a preset reference direction, the electronic device can decrease the relative output level (or, output gain) of the sound corresponding to the picked up sound data. If the sound pick-up direction does not match the preset reference direction, the electronic device can increase the relative output level (or, output gain) of the sound corresponding to the picked up sound data. In one embodiment, the electronic device may adjust the output levels of the sounds to be output through the speaker according to the direction of the sound picked up by the microphone.

In various embodiments, the electronic device can process sound data to be output through the speaker according to the direction in which the sound is picked up by the microphone. Hence, the electronic device can adjust the relative output levels of the sounds corresponding respectively to the audio data received from the external electronic device and the sound data picked up by the microphone.

Figure 14:
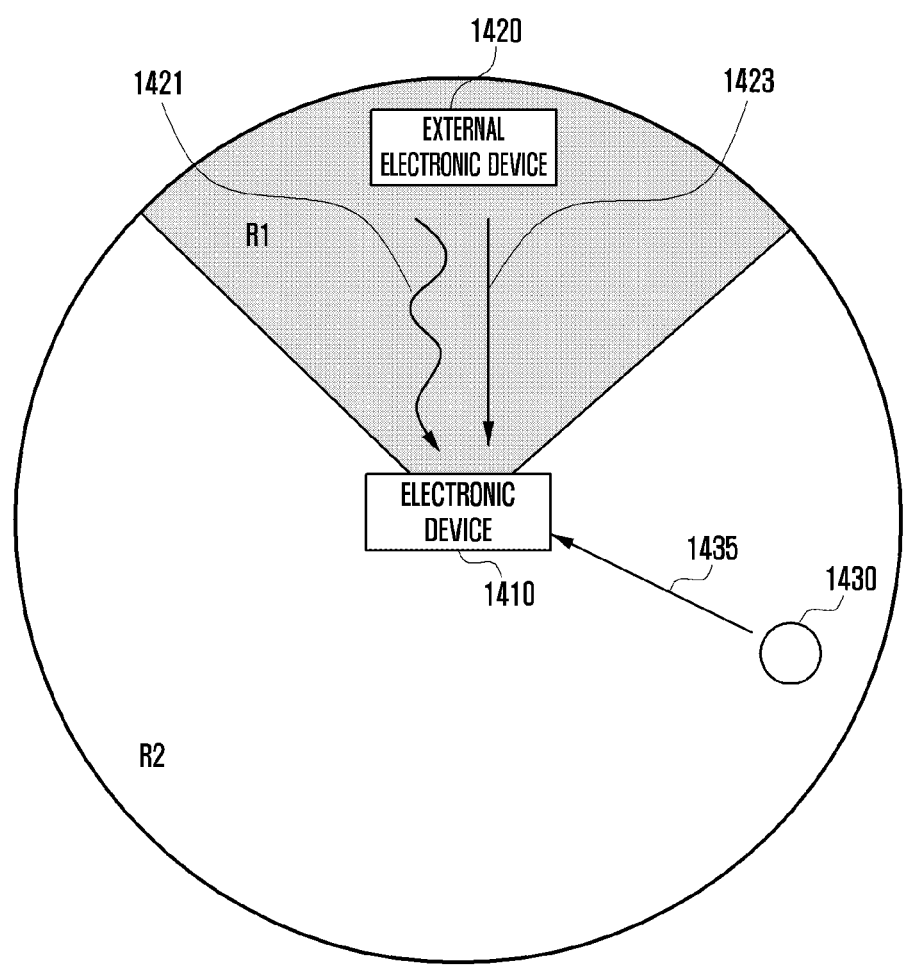
FIG. 14 depicts operations of the electronic device according to various embodiments of the present invention.

FIG. 14 depicts operations of the electronic device according to various embodiments of the present invention.

In one embodiment, the electronic device 1410 may wirelessly receive audio data 1421 from the external electronic device 1420. For example, the electronic device 1410 may receive a signal 1421 including audio data from the external electronic device 1420 (e.g., smart TV or smart audio equipment) through a well-known wireless communication scheme. While receiving the audio data 1421, the electronic device 1410 may pick up sounds 1423 and 1435 from the outside via the microphone. For example, the electronic device 1410 may pick up the sound 1423 output by the speaker of the external electronic device 1420. The electronic device 1410 may pick up an ambient sound (e.g., speech signal 1435 of another person 1430).

In one embodiment, the electronic device 1410 can process sound data to be output through the speaker according to the direction in which the sound 1423 or 1435 is picked up. For example, the electronic device 1410 may amplify the sounds 1423 and 1435 picked up by the microphone differently according to the sound pick-up directions and output the amplified sound data through the speaker. The electronic device 1410 can adjust the relative levels of the output sounds corresponding respectively to the audio data 1412 received from the external electronic device 1420 and the sounds 1423 and 1435 picked up by the microphone.

In one embodiment, the electronic device 1410 can set different output gains for the picked up sounds 1423 and 1435 according to whether the direction in which the sound 1423 or 1435 is picked up by the microphone matches a preset direction (or, is within a preset direction range). For example, the electronic device 1410 may set a small amplification value for the sound 1423 picked up in the direction of the external electronic device 1420 (e.g., area R1), and may set a large amplification value for the sound 1435 picked up in a direction different from the direction of the external electronic device 1420 (e.g., area R2).

In one embodiment, the electronic device 1410 may set the reference direction information. For example, the electronic device 1410 may set a specific direction or a specific direction range with respect to the electronic device 1410 as the reference direction. The electronic device can set the direction of the external electronic device 1420 or a certain range (R1) with respect to the direction of the external electronic device 1420 as the reference direction. In one embodiment, the electronic device 1410 can set the reference direction according to the result of comparison between the audio data 1421 received from the external electronic device 1420 and the sound data 1423 or 1435 picked up by the microphone. For example, the electronic device 1410 may determine the level of similarity between the audio data 1421 and the sound data 1423 or 1435 picked up by the microphone. The electronic device 1410 may convert the format of the sound data 1423 or 1435 picked up by the microphone into a format identical to the format of the audio data 1421 received from the external electronic device 1420. For example, the electronic device 1410 may convert the sound data 1423 or 1435 picked up by the microphone into digital data (digital signal). The electronic device 1410 may set the direction range where the level of similarity between the audio data 1421 and the sound data 1423 or 1435 picked up by the microphone is higher than or equal to a preset threshold (i.e. the direction range where the audio data 1421 is found to be identical or similar to the sound data 1423 or 1435 picked up by the microphone) as the reference direction (e.g., area R1). The electronic device 1410 may identify the direction in which the sound data 1423 or 1435 is picked up by the microphone and adjust the output level of the sound to be output through the speaker corresponding to the sound data 1423 or 1435 picked up by the microphone according to whether the sound pick-up direction matches the reference direction (R1). For example, if the sound pick-up direction matches the reference direction (R1), the electronic device 1410 may decrease the output level of the sound corresponding to the sound data 1423 picked up by the microphone. If the sound pick-up direction is different from the reference direction (R1), the electronic device 1410 may increase the output level of the sound corresponding to the sound data 1435 picked up by the microphone. For example, the signal (audio data) 1421 transmitted by the external electronic device 1420 and the sound 1423 output by the external electronic device 1420 may include the same audio information. In this case, when the electronic device 1410 outputs the sounds corresponding respectively to the audio data 1421 and the sound data 1423 from the external electronic device 1420 together through the speaker, it may be difficult to provide accurate audio information to the user owing to an echo phenomenon or being out of synchronization. Hence, when receiving audio data 1421 from the external electronic device 1420, the electronic device 1410 may not output the sound corresponding to the sound data 1423 picked up in the direction of the external electronic device 1420, or output the sound corresponding to the sound data 1423 at a low volume. The electronic device 1410 may output the sound corresponding to the sound data 1435 picked up in a direction different from the direction of the external electronic device 1420 at a relatively high volume. For example, the electronic device 1410 may output the sound corresponding to the sound data 1435 picked up in a direction different from the direction of the external electronic device 1420 at a volume higher than or equal to the volume for the sound corresponding to the audio data 1421 received from the external electronic device 1420.

In one embodiment, the electronic device 1410 may specify a preset direction or range (R1) according to the direction of the external electronic device 1420. For example, the electronic device 1410 may identify the location of the external electronic device 1420 based on a signal (e.g., audio data 1421) received from the external electronic device 1420. Upon identifying the location of the external electronic device 1420, the electronic device 1410 can specify a specific range R1 including the direction or location of the external electronic device 1420. The electronic device 1410 may set a low output gain for the sound data picked up in the specified direction or range.

In one embodiment, the electronic device 1410 may specify a preset direction or range according to the result of comparison between the audio data 1421 received from the external electronic device 1420 and the sound data 1423 or 1435 picked up by the microphone. For example, the electronic device 1410 may convert the format of the picked up sound data 1423 or 1435 into a format identical to the format of the audio data 1421. The electronic device 1410 may identify the level of similarity between the received audio data 1421 and the picked up sound data 1423 or 1435. The electronic device 1410 may determine whether the level of similarity between the received audio data 1421 and the picked up sound data 1423 or 1435 is higher than or equal to a preset threshold.

For example, if the audio data 1421 is similar to the picked up sound data 1423, the electronic device 1410 can specify the sound pick-up direction or a specific range R1 including the sound pick-up direction as a preset direction or range. If the audio data 1421 is different from the picked up sound data 1435, the electronic device 1410 can specify the corresponding sound pick-up direction as a separate direction or range (R2) different from the preset direction or range.

In one embodiment, the electronic device 1410 can set different output gains for the picked up sound data 1423 and 1435 according to whether the direction in which the sound 1423 or 1435 is picked up by the microphone is in a preset direction or range. For example, the electronic device 1410 may change the speaker output volume for the picked up sound data 1423 or 1435 according to whether the direction in which the sound data 1423 or 1435 is picked up by the microphone is in the preset direction or range (R1).

Figure 15:
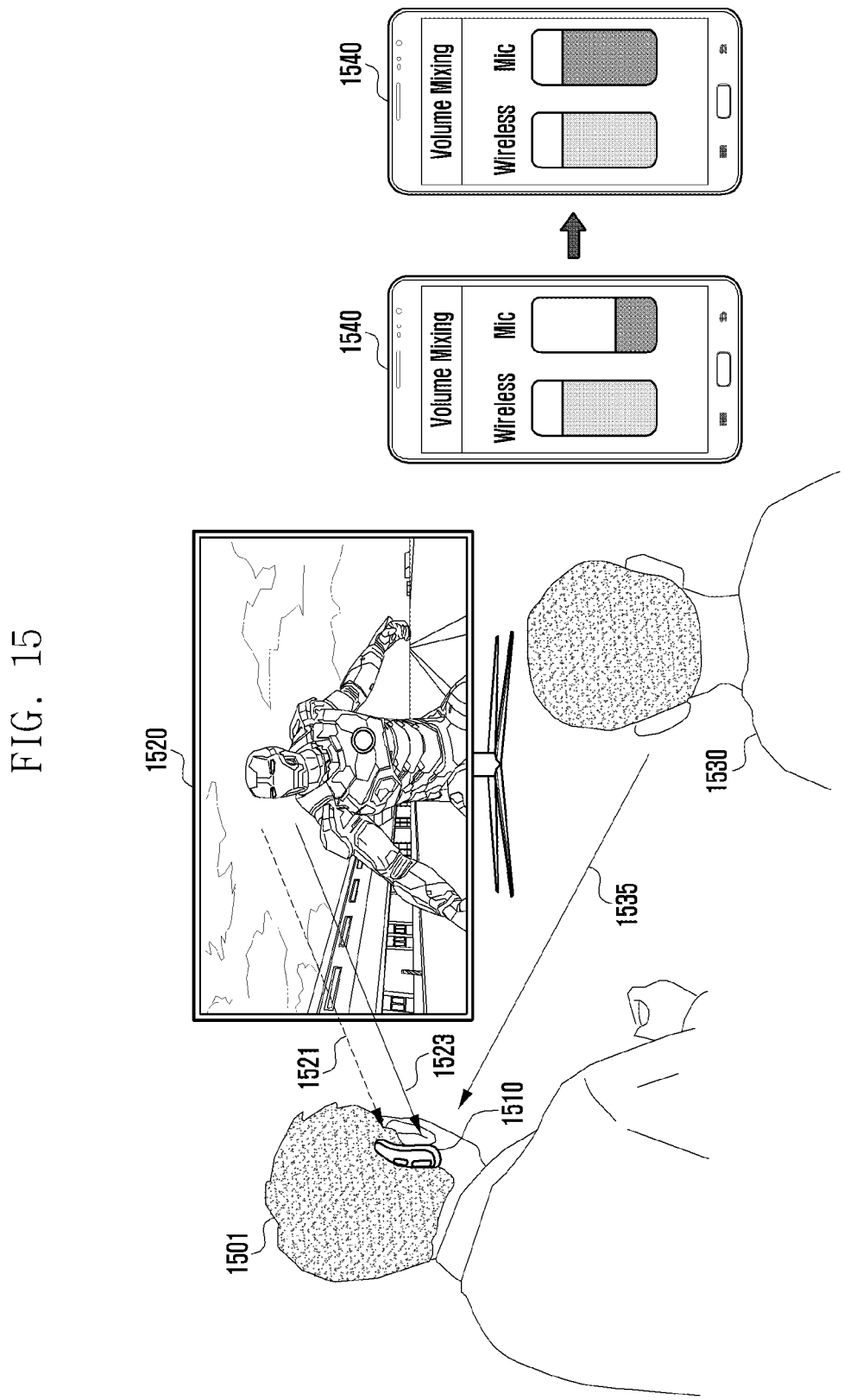
FIG. 15 depicts operations of the electronic device according to various embodiments of the present invention.

FIG. 15 depicts operations of the electronic device according to various embodiments of the present invention.

In one embodiment, the electronic device 1510 may be worn by the user 1501 as a wearable device. For example, the electronic device 1510 (e.g., auditory device) may include a housing having a part configured to be removably attachable to the ear of the user 1501.

In one embodiment, the electronic device 1510 (e.g., auditory device) may wirelessly receive audio data from the first external device 1520 (e.g., smart TV). While receiving audio data from the first external device 1520, the electronic device 1510 may use the microphone to pick up sounds 1523 and 1535 from the outside. For example, the electronic device 1510 may pick up the sound 1523 output by the first external device 1520. The electronic device 1510 may pick up the sound 1535 issued by a different person 1530.

In one embodiment, the electronic device 1510 may use the speaker to output the sounds corresponding respectively to the audio data 1521 received from the first external device 1520 and the sound data 1523 and 1535 picked up from the outside.

In one embodiment, the electronic device 1510 may adjust the volume mixing ratio between the audio data 1521 and the sound data 1523 and 1535 picked up by the microphone by processing the sound data to be output through the speaker. For example, the electronic device 1510 can output the sounds corresponding to the sound data 1523 and 1535 picked up by the microphone at the same volume, at a relatively higher volume, or at a relatively lower volume compared with the sound corresponding to the audio data 1521.

In one embodiment, the electronic device 1510 can adjust the volume mixing ratio between the sounds to be output through the speaker according to the level of similarity (or correlation) between the audio data 1521 and the sound data 1523 and 1535 picked up by the microphone. For example, when the level of similarity or correlation between the audio data 1521 and the picked up sound data 1523 is higher than or equal to a preset threshold (e.g., the energy ratio of the sound 1523 output by the first external device 1520 among the sounds 1523 and 1535 picked up by the microphone is higher than or equal to a preset value), the electronic device 1510 can reduce the relative output level of the sounds corresponding to the sound data 1523 and 1535 picked up by the microphone. When the level of similarity or correlation between the audio data 1521 and the picked up sound data 1523 is lower than the preset threshold (e.g., ambient sound 1535 is picked up by the microphone from the outside of the first external device 1520, or the energy ratio of the ambient sound 1535 among the sounds 1523 and 1535 picked up together by the microphone is higher than or equal to a preset value), the electronic device 1510 can increase the relative output level of the sounds corresponding to the sound data 1523 and 1535 picked up by the microphone. For example, the audio data 1521 transmitted by the first external device 1520 and the sound 1523 output by the speaker of the first external device 1520 may correspond to the same audio information. In this case, when the magnitude of the sound 1523 output by the first external device 1520 is larger than that of the ambient sound 1535, the level of similarity between the audio data 1521 received by the electronic device 1510 and the sound data 1523 and 1535 picked up by the microphone may be relatively high. In reverse, when the magnitude of the ambient sound 1535 is larger than that of the sound 1523 output by the first external device 1520, the level of similarity between the audio data 1521 received by the electronic device 1510 and the sound data 1523 and 1535 picked up by the microphone may be relatively low. In one embodiment, the electronic device 1510 may use the speaker to output the sounds corresponding respectively to the audio data 1521 and the picked up sound data 1523 and 1535. If the level of similarity between the audio data 1521 and the picked up sound data 1523 and 1535 is higher than or equal to the preset threshold, the electronic device 1510 may set a high relative output level for the sound corresponding to the audio data 1521. If the level of similarity between the audio data 1521 and the picked up sound data 1523 and 1535 is lower than the preset threshold, the electronic device 1510 may set a high relative output level for the sounds corresponding to the picked up sound data 1523 and 1535.

In one embodiment, the electronic device 1510 may operate in cooperation with the second external device 1540 (e.g., mobile terminal) and cause the second external device 1540 to present the set volume mixing ratio on the display. For example, the second external device 1540 may display the mixing ratio of the sounds output by the electronic device 1510 based on a signal or data received from the electronic device 1510.

In one embodiment, when receiving audio data 1521 from the first external device 1520, the electronic device 1510 may decrease the output gain for the sounds 1523 and 1535 picked up by the microphone. For example, when the user 1501 watches the smart TV, the electronic device 1510 may receive audio data 1521 from the smart TV. To block external noise while the user 1501 is watching the TV and to eliminate the echo phenomenon caused by the overlap between the audio data 1521 transmitted by the first external device 1520 and the sound data 1523 output by the first external device 1520, the electronic device 1510 may decrease the output gain for the sounds 1523 and 1535 picked up by the microphone. For example, the electronic device 1510 may output only the sound corresponding to the audio data 1521 so that the user 1501 can listen only to the sound corresponding to the audio data 1521 received from the smart TV. The electronic device 1510 may set the output volume to zero or set the output volume to a small value for the sounds 1523 and 1535 picked up by the microphone among the sounds to be output through the speaker.

In one embodiment, the electronic device 1510 may identify the direction in which the sound 1523 or 1535 is picked up from the outside. The electronic device 1510 may set the output volume differently according to the direction where the sound 1523 or 1535 is picked up by the microphone. For example, the electronic device 1510 may set a relatively low output volume for the sound 1523 picked up in the direction of the first external device 1510, and set a relatively high output volume for the sound 1535 picked up in a direction different from that of the first external device 1510.

In one embodiment, the electronic device 1510 may adjust the volume mixing ratio between the sounds to be output through the speaker on the basis of a signal or data received from the second external device 1540. For example, when the second external device 1540 receives an input for adjusting the volume mixing ratio from the user 1501, the electronic device 1510 may receive a signal or data corresponding to the input of the user 1501 from the second external device 1540 and change the volume mixing ratio according to the received signal or data.

Figure 16:
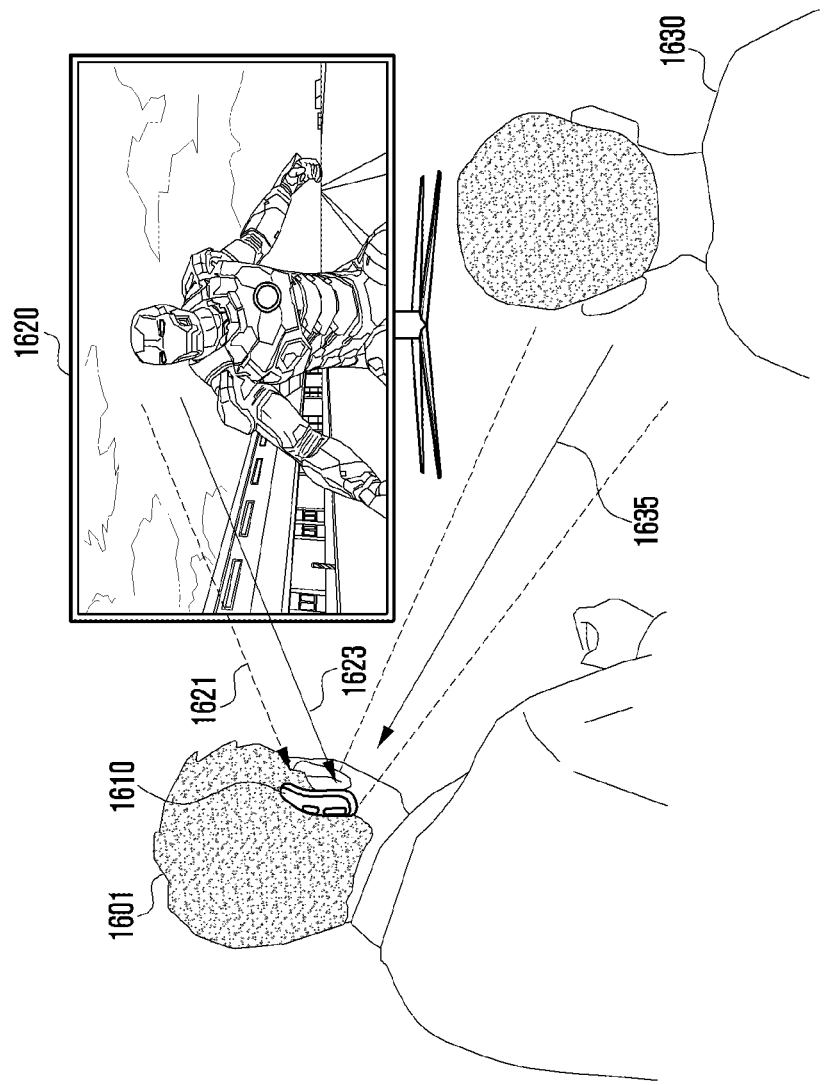
FIG. 16 depicts operations of the electronic device according to various embodiments of the present invention.

FIG. 16 depicts operations of the electronic device according to various embodiments of the present invention.

In one embodiment, the electronic device 1610 (e.g., auditory device) may wirelessly receive audio data from the external electronic device 1620 (e.g., smart TV). While receiving audio data from the external device 1620, the electronic device 1610 may use the microphone to pick up sounds 1623 and 1635 from the outside.

In one embodiment, the electronic device 1610 may use the speaker to output the sounds corresponding respectively to the audio data 1621 received from the external device 1620 and the sound data 1623 and 1635 picked up from the outside.

In one embodiment, the electronic device 1610 may adjust the volume mixing ratio between the audio data 1621 and the sound data 1623 and 1635 picked up by the microphone by processing the sound data to be output through the speaker. For example, the electronic device 1610 can output the sounds corresponding to the sound data 1623 and 1635 picked up by the microphone at the same volume, at a relatively higher volume, or at a relatively lower volume compared with the sound corresponding to the audio data 1621.

In one embodiment, when receiving audio data 1621 from the external device 1620, the electronic device 1610 may reduce the output gain for the sounds 1623 and 1635 picked up by the microphone. For example, the electronic device 1610 may set the output volume to zero or set the output volume to a small value for the sounds 1623 and 1635 picked up by the microphone among the sounds to be output through the speaker.

In one embodiment, the electronic device 1610 may increase the output volume for the sounds corresponding to the sound data 1623 and 1635 picked up by the microphone when a sound with a preset level (intensity) or more is picked up from the outside by the microphone or when a sound different from a radio signal (e.g., audio data 1621 from the external electronic device 1620) is received for a preset time or more. For example, when the nearby person 1630 speaks continuously or with a loud voice while the user 1601 is watching the smart TV, the user 1601 may recognize the ambient sound (e.g., speech of the person 1630) and increase the output volume for the sound picked up by the microphone (speech signal 1635 from the person 1630). For example, the electronic device 1610 may determine the level of similarity between the received audio data 1621 and the sound data 1623 and 1635 picked up by the microphone. If the audio data 1621 is different from the picked up sound data 1623 or 1635 (i.e., an ambient sound not related to the external electronic device 1620 (e.g., speech signal 1635 of the nearby person 1630) is picked up), the electronic device 1610 may set a high volume level for the sounds corresponding to the sound data 1623 or 1635 picked up by the microphone.

In one embodiment, the electronic device 1610 may process the sound data to be output through the speaker according to the direction where the sound 1623 or 1635 is picked up by the microphone. For example, the electronic device 1610 may amplify the sound data 1623 or 1635 picked up by the microphone differently according to the sound pick-up direction and output the amplified sound data through the speaker. The electronic device 1610 can adjust the relative levels of the output sounds corresponding respectively to the audio data 1612 received from the external electronic device 1620 and the sounds 1623 and 1635 picked up by the microphone.

In one embodiment, the electronic device 1610 can set different output gains for the picked up sounds 1623 and 1635 according to whether the direction in which the sound 1623 or 1635 is picked up by the microphone matches a preset direction (or, is within a preset direction range). For example, the electronic device 1610 may set a small amplification value for the sound 1623 picked up in the direction of the external electronic device 1620 (e.g., a range of directions around the external electronic device 1620), and may set a large amplification value for the sound 1635 picked up in a direction different from the direction of the external electronic device 1620 (e.g., a range other than the given range around the external electronic device 1620).

In one embodiment, the electronic device 1610 may set the reference direction information. For example, the electronic device 1610 may set a specific direction or a specific direction range with respect to the electronic device 1610 as the reference direction. The electronic device can set the direction of the external electronic device 1620 or a certain range with respect to the direction of the external electronic device 1620 as the reference direction. In one embodiment, the electronic device 1610 can set the reference direction according to the result of comparison between the audio data 1621 received from the external electronic device 1620 and the sound data 1623 or 1635 picked up by the microphone. For example, the electronic device 1610 may determine the level of similarity between the audio data 1621 and the sound data 1623 or 1635 picked up by the microphone. The electronic device 1610 may set the direction range where the level of similarity between the audio data 1621 and the sound data 1623 or 1635 picked up by the microphone is higher than or equal to a preset threshold as the reference direction. The electronic device 1610 may identify the direction in which the sound data 1623 or 1635 is picked up by the microphone and adjust the output level of the sound to be output through the speaker corresponding to the sound data 1623 or 1635 picked up by the microphone according to whether the sound pick-up direction matches the reference direction. For example, if the sound pick-up direction matches the reference direction, the electronic device 1610 may decrease the output level of the sound corresponding to the sound data 1623 picked up by the microphone. If the sound pick-up direction is different from the reference direction, the electronic device 1610 may increase the output level of the sound corresponding to the sound data 1635 picked up by the microphone. For example, the signal (audio data) 1621 transmitted by the external electronic device 1620 and the sound 1623 output by the external electronic device 1620 may include the same audio information. When receiving audio data 1621 from the external electronic device 1620, the electronic device 1610 may not output the sound corresponding to the sound data 1623 picked up in the direction of the external electronic device 1620, or output the sound corresponding to the sound data 1623 at a low volume. The electronic device 1610 may output the sound corresponding to the sound data 1635 picked up in a direction different from the direction of the external electronic device 1620 at a relatively high volume. For example, the electronic device 1610 may output the sound corresponding to the sound data 1635 picked up in a direction different from the direction of the external electronic device 1620 at a volume higher than or equal to the volume for the sound corresponding to the audio data 1621 received from the external electronic device 1620.

In one embodiment, the electronic device 1610 may specify a preset direction or range according to the direction of the external electronic device 1620. For example, the electronic device 1610 may identify the location of the external electronic device 1620 based on a signal (e.g., audio data 1621) received from the external electronic device 1620. Upon identifying the location of the external electronic device 1620, the electronic device 1610 can specify a specific range including the direction or location of the external electronic device 1620. The electronic device 1610 may set a low output gain for the sound data picked up in the specified direction or range.

In one embodiment, the electronic device 1610 may specify a preset direction or range according to the result of comparison between the audio data 1621 received from the external electronic device 1620 and the sound data 1623 or 1635 picked up by the microphone. For example, the electronic device 1610 may convert the format of the picked up sound data 1623 or 1635 into a format identical to the format of the audio data 1621. The electronic device 1610 may identify the level of similarity between the received audio data 1621 and the picked up sound data 1623 or 1635. The electronic device 1610 may determine whether the level of similarity between the received audio data 1621 and the picked up sound data 1623 or 1635 is higher than or equal to a preset threshold.

For example, if the audio data 1621 is similar to the picked up sound data 1623, the electronic device 1610 can specify the sound pick-up direction or a specific range including the sound pick-up direction as a preset direction or range. If the audio data 1621 is different from the picked up sound data 1635, the electronic device 1610 can specify the corresponding sound pick-up direction as a separate direction or range different from the preset direction or range.

In one embodiment, the electronic device 1610 can set different output gains for the picked up sound data 1623 and 1635 according to whether the direction in which the sound 1623 or 1635 is picked up by the microphone is in a preset direction or range (R1). For example, the electronic device 1610 may change the speaker output volume for the picked up sound data 1623 or 1635 according to whether the direction in which the sound data 1623 or 1635 is picked up by the microphone is in the preset direction or range (R1).

In one embodiment, the electronic device 1610 can set the direction of the microphone in a specific direction while outputting the sound corresponding to the audio data 1621 received from the external device 1620. For example, when a sound with a preset level (intensity) or more is picked up from the outside by the microphone, or when a sound different from the radio signal from the external electronic device 1620 (e.g., audio data 1621 received from the external electronic device 1620) is received for a preset time or more, the electronic device 1610 can set the microphone direction in the direction in which the sound is picked up. In one embodiment, the electronic device 1610 may pick up a sound through a plurality of microphones. The electronic device 1610 can identify the direction of the picked up sound by using the arrival time difference between the microphones picking up the sound. For example, the electronic device 1610 may identify the sound pick-up direction by analyzing the difference in time when the same sound is picked up the individual microphones. In one embodiment, after identifying the sound pick-up direction, the electronic device 1610 may set the microphone direction in the sound pick-up direction.

In one embodiment, the electronic device 1610 may increase the output volume for the sound 1635 picked up in the specified direction. For example, upon sensing a sound 1635 having a preset level or higher or lasting for a preset time or more from the outside while outputting only the sound corresponding to the audio data 1621 received from the external device 1620, the electronic device 1610 may configure beamforming in the direction of the sensed sound 1635. For example, upon sensing a sound 1635 with a preset level or lasting for a preset time or more from the outside, the electronic device 1610 may increase the output volume for the sound picked up in the direction in which the sound 1635 is picked up.

In one embodiment, even upon sensing a sound having a preset level (intensity) or higher or lasting for a preset time or more from the outside, the electronic device 1610 may not increase the output volume for the sound 1623 picked up in the direction of the external electronic device 1620.

Figure 17:
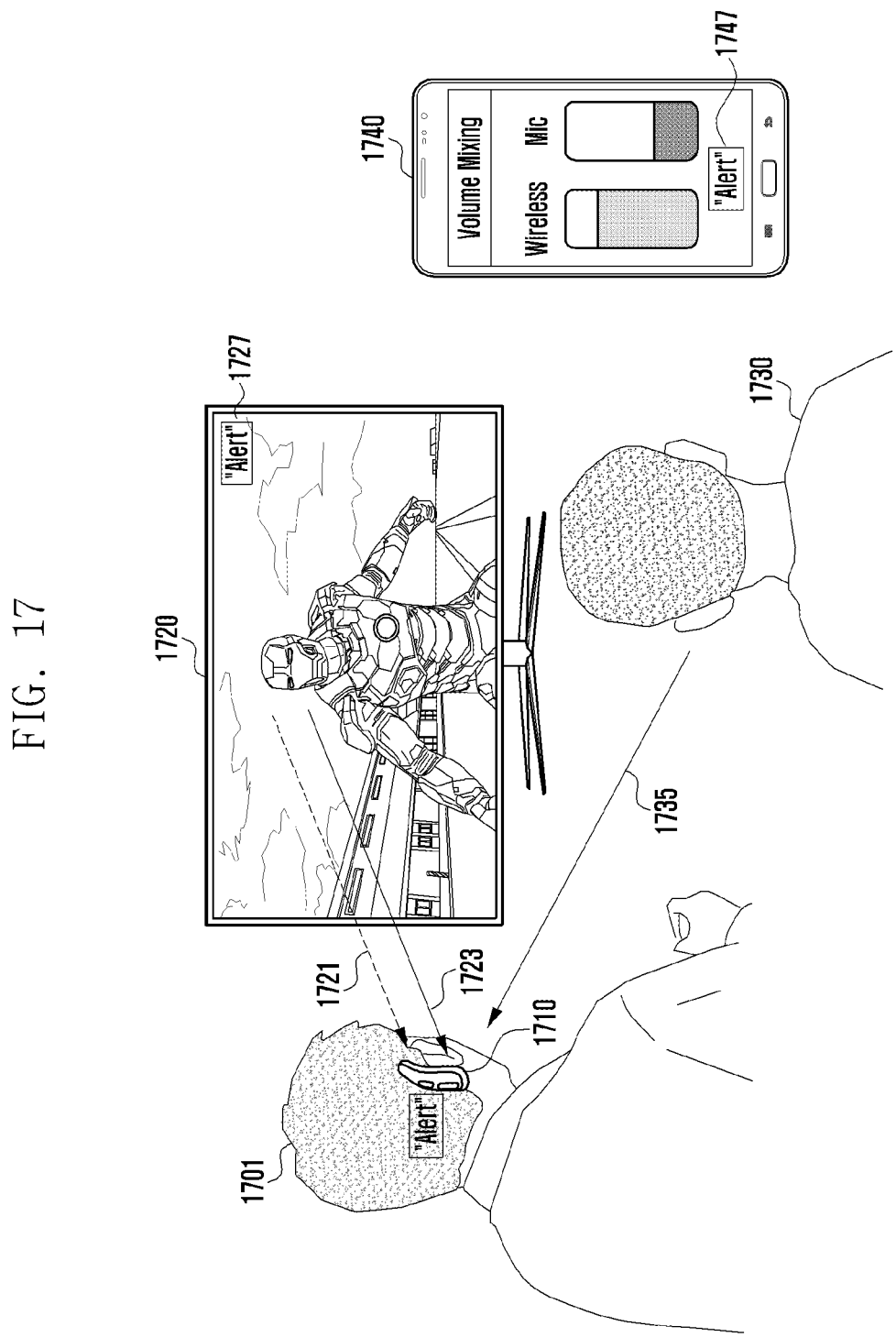
FIG. 17 depicts operations of the electronic device according to various embodiments of the present invention.

FIG. 17 depicts operations of the electronic device according to various embodiments of the present invention.

In one embodiment, the electronic device 1710 (e.g., auditory device) may wirelessly receive audio data from the first external device 1720 (e.g., smart TV). While receiving audio data from the first external device 1720, the electronic device 1710 may use the microphone to pick up sounds 1723 and 1735 from the outside.

In one embodiment, the electronic device 1710 may use the speaker to output the sounds corresponding respectively to the audio data 1721 received from the first external device 1720 and the sound data 1723 and 1735 picked up from the outside.

In one embodiment, the electronic device 1710 may adjust the volume mixing ratio between the audio data 1721 and the sound data 1723 and 1735 picked up by the microphone by processing the sound data to be output through the speaker.

In one embodiment, the electronic device 1710 may operate in cooperation with the second external device 1740 (e.g., mobile terminal) and cause the second external device 1740 to present the set volume mixing ratio on the display.

In one embodiment, the electronic device 1710 may identify the direction in which the sound 1723 or 1735 is picked up from the outside. In one embodiment, the electronic device 1710 can determine whether the sound 1723 or 1735 is picked up in the direction of the first external device 1720. For example, the electronic device 1710 may identify the level of similarity between the audio data 1721 received from the first external device 1720 and the sound data picked up by the microphone. If the level of similarity between the audio data 1721 and the sound data 1723 picked up by the microphone is higher than or equal to a preset threshold, the electronic device 1710 may determine that the sound data 1723 is picked up in the direction of the first external device 1720. If the level of similarity between the audio data 1721 and the sound data picked up by the microphone is lower than the preset threshold (i.e., the ambient sound 1735 is picked up by the microphone), the electronic device 1710 may determine that the sound data is picked up in a direction different from the direction of the first external device 1720.

In one embodiment, when sound data is picked up in a direction different from the direction of the first external device 1720 (e.g., speech signal 1735 from the nearby person 1730), the electronic device 1710 may output a corresponding notification. For example, the electronic device 1710 may output an alert sound through the speaker or may generate vibration. When sound data 1735 is picked up in a direction different from the direction of the first external device 1720, the electronic device 1710 may provide the user with an auditory or tactile notification indicating detection of a sound different from the audio data 1721 received from the first external device.

In one embodiment, the electronic device 1710 may compare the audio data 1721 received from the first external device 1720 with the sound data 1723 or 1735 picked up by the microphone. If the first external device 1720 is different from the sound data 1723 or 1735 picked up by the microphone, the electronic device 1710 may output a corresponding notification. For example, if the level of similarity between the audio data 1721 and the picked up sound data 1723 or 1735 is lower than a preset threshold, the electronic device 1710 may output a notification. For example, when the sound 1723 output by the second external device 1720 is picked up, the electronic device 1710 may determine that the level of similarity between the audio data 1721 and the picked up sound 1723 is higher than or equal to the preset threshold and may not output a notification. When an ambient sound (e.g., speech signal 1735 from the nearby person 1730) is picked up, the electronic device 1710 may determine that the level of similarity between the audio data 1721 and the picked up sound 1735 is lower than the preset threshold and may output a notification. For example, the electronic device 1710 may output an alert sound through the speaker or may generate vibration.

In one embodiment, instead of directly outputting a notification (e.g., sound alert or vibration), the electronic device 1710 may transmit the external device 1720 or 1740 a signal or command for outputting a notification. For example, the electronic device 1710 may transmit the first external device 1720 (e.g., smart TV) a command for displaying a notification message 1727 at a portion of the display. Upon reception of the signal from the electronic device 1710, the first external device 1720 may display a notification message 1727 on the display. For example, the electronic device 1710 may transmit the second external device 1740 (e.g., mobile terminal) a command for displaying a notification message 1747 at a portion of the display or for generating vibration. Upon reception of the signal from the electronic device 1710, the second external device 1740 may display a notification message 1747 on the display or may generate vibration.

Figure 18:
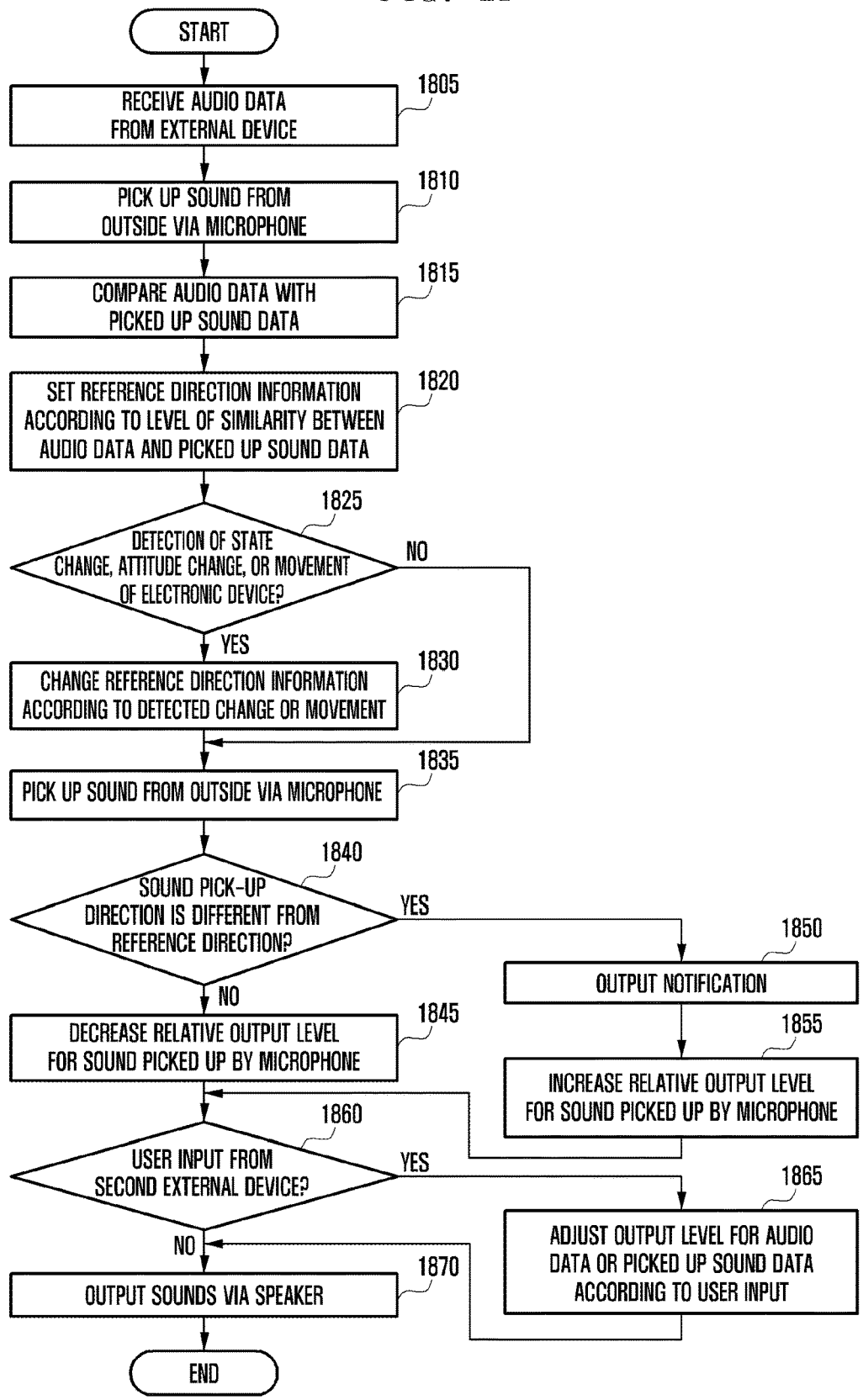
FIG. 18 is a flowchart of an operation control method for the electronic device according to various embodiments of the present invention.

FIG. 18 is a flowchart of an operation control method for the electronic device according to various embodiments of the present invention.

At operation 1805, the electronic device may receive audio data from the external device. For example, the electronic device can receive streaming content from the external device (e.g., smart TV or audio equipment).

At operation 1810, the electronic device may pick up a sound from the outside by use of the microphone. For example, the electronic device may use the microphone to pick up a sound from the outside while receiving the audio data. The electronic device may at least temporarily store the picked up sound data. The electronic device may store information about the direction in which the sound is picked up together with the received sound data. For example, the electronic device may convert the format of the picked up sound data into a format identical to that of the audio data, and store the converted sound data.

At operation 1815, the electronic device may compare the received audio data and the picked up sound data. For example, the electronic device may examine the level of similarity between the received audio data and the picked up sound data.

At operation 1820, the electronic device may set the reference direction information according to the level of similarity between the audio data and the picked up sound data. For example, the electronic device may set a specific direction or range as the reference direction according to the level of similarity between the audio data and the picked up sound data. If the level of similarity between the audio data and the picked up sound data is higher than or equal to a preset threshold, the electronic device may set the sound pick-up direction or a range including the sound pick-up direction as the reference direction. If the level of similarity between the audio data and the picked up sound data is lower than the preset threshold, the electronic device may exclude the sound pick-up direction or a range including the sound pick-up direction from the reference direction. A specific direction or a specific range with respect to the electronic device (e.g., a range within a given angle relative to the electronic device) may be set as the reference direction. For example, the electronic device may set the direction range where the level of similarity between the audio data and the sound data picked up in any direction is higher than or equal to the preset threshold as the reference direction.

At operation 1825, the electronic device may detect a change in the state or attitude thereof or movement thereof. For example, the electronic device can use sensors to detect a state change, attitude change, or movement thereof. If a state change, attitude change, or movement is detected, the procedure proceeds to operation 1830; and if no state change, attitude change, or movement is detected, the procedure proceeds to operation 1835.

At operation 1830, the electronic device may change the reference direction information. For example, when the reference direction is set to the front direction or a partial front area of the electronic device, the electronic device may change the reference direction to the left direction thereof as the electronic device is rotated in the right direction. For example, after the electronic device (e.g., auditory device) sets the front direction of the external electronic device as the reference direction, the direction of the electronic device can be changed according to the movement of the user wearing the electronic device. In this case, to maintain the direction in which the external electronic device is located as the reference direction, the electronic device can change the reference direction according to the changed direction thereof. For example, when the user wearing the electronic device at the ear turns the head to the right, the external electronic device having positioned at the front of the electronic device is positioned on the left side of the electronic device. Hence, the electronic device may reset the reference direction from the front direction to the left direction.

At operation 1835, the electronic device may pick up a sound from the outside through the microphone. In various embodiments, the electronic device can pick up a sound from the outside through the microphone and receive audio data after or during setting the reference direction.

At operation 1840, the electronic device may determine whether the sound pick-up direction is different from the set reference direction. For example, the electronic device may extract information on the direction in which the sound is picked up by the microphone from the picked up sound data. The electronic device may compare the extracted information about the direction with the reference direction information. The electronic device may determine whether the sound pick-up direction matches the reference direction or is within the range indicated by the reference direction information.

If the sound pick-up direction matches the reference direction, at operation 1845, the electronic device may decrease the relative output level for the sound picked up by the microphone. For example, the electronic device may adjust the volume mixing ratio between the sounds corresponding respectively to the audio data received from the external electronic device and the sound data picked up by the microphone among the sound data to be output through the speaker. Specifically, the electronic device may increase the output volume for the sound corresponding to the sound data picked up by the microphone relative to the sound corresponding to the audio data.

If the sound pick-up direction does not match the reference direction, at operation 1850, the electronic device may output a corresponding notification. For example, the electronic device may output an alert sound or generate vibration. Alternatively, the electronic device may transmit the external device a signal or command for displaying a notification message on the display or for generating vibration.

At operation 1855, the electronic device may increase the relative output level for the sound corresponding to the sound data picked up by the microphone when the sound pick-up direction does not match the reference direction. For example, the electronic device may adjust the volume mixing ratio between the sounds corresponding respectively to the audio data received from the external electronic device and the sound data picked up by the microphone among the sound data to be output through the speaker. Specifically, the electronic device may decrease the output volume for the sound corresponding to the sound data picked up by the microphone relative to the sound corresponding to the audio data.

At operation 1860, the electronic device may determine whether a user input is received via the external device. For example, when the external device (e.g., mobile terminal) receives an input for changing the settings of the electronic device (e.g., reference direction or volume mixing ratio) from the user, the external device may send the electronic device a command or data corresponding to the user input. The electronic device may sense reception of a specific signal (e.g., command or data related to user input) from the external device. If a user input is received via the external device, the procedure proceeds to operation 1865; and if a user input is not received via the external device, the procedure proceeds to operation 1870.

At operation 1865, the electronic device may adjust the output level for the sound corresponding to the audio data or the picked up sound data according to the user input. For example, the electronic device may change the volume mixing ratio between the sounds corresponding respectively to the audio data and the picked up sound data among the sound data to be output through the speaker.

At operation 1870, the electronic device may output the sounds corresponding respectively to the audio data and the sound data picked up by the microphone through the speaker according to the set volume mixing ratio (e.g., output volume levels set for the sounds corresponding respectively to the audio data and the sound data picked up by the microphone).

In various embodiments, some or all of the operations illustrated in FIG. 18 or in the related description may be performed by the electronic device in a different order, and some of the operations may be skipped.

According to an embodiment of the present invention, the operation control method for the electronic device may include: receiving audio data from an external electronic device; picking up a sound from the outside of the electronic device through at least one microphone; extracting information on the direction in which the sound is picked up from the sound data picked up by the at least one microphone; and processing sound data to be output through the speaker based on the information about the direction in which the sound is picked up.

In one embodiment, to process sound data to be output through the speaker, the electronic device may adjust the output levels for the sounds corresponding respectively to the audio data and the picked up sound data among the sound data to be output through the speaker.

In one embodiment, processing sound data to be output may include: comparing the information about the direction in which the sound is picked up with preset reference direction information; and processing the sound data to be output according to the result of comparison between the direction information and the reference direction information.

In one embodiment, processing sound data to be output may include: determining the level of similarity between the received audio data and the sound data picked up by the microphone; and setting the reference direction information on the basis of the similarity level and the information about the direction in which the sound is picked up.

In one embodiment, processing sound data to be output may include: determining the level of similarity between the received audio data and the sound data picked up by the microphone; decreasing the output level for the sound corresponding to the picked up sound data if the similarity level is higher than or equal to a preset threshold; and increasing the output level for the sound corresponding to the picked up sound data if the similarity level is lower than the preset threshold.

In one embodiment, to process sound data to be output, if the similarity level is lower than the preset threshold, the electronic device may output a notification through the speaker or transmit the external electronic device a command for outputting a notification message.

In one embodiment, processing sound data to be output may include: extracting sound data received within a given range from the sound data picked up by the microphone based on the preset reference direction information; and adjusting the output level for the sound corresponding to the extracted sound data.

In the present disclosure, the term "module" may refer to a certain unit that includes one of hardware, software, or firmware or any combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, that performs one or more particular functions. The module may be realized mechanically or electronically. For example, the module may include at least one of an ASIC (application-specific integrated circuit) chip, FPGA (field-programmable gate array), and PLD (programmable-logic device), which are known or are to be developed in the future.

At least a part of the device (e.g., modules or functions) or the method (e.g., operations) according to various embodiments may be implemented as instructions in the form of a program module, which can be stored in a computer readable storage medium. When the instructions are executed by at least one processor (e.g., processor 120), the processor may carry out functions corresponding to the instructions. For example, the memory 130 may be a computer readable storage medium.

The computer readable storage media may include magnetic media such as a hard disk, floppy disk and magnetic tape, optical media such as a CD-ROM and DVD, magneto-optical media such as a floptical disk, and memory devices such as a ROM, RAM, and flash memory. The program instructions may include machine codes produced by compilers and high-level language codes executable through interpreters. The above-described hardware device may be configured to operate as one or more software modules so as to perform operations of various embodiments, and vice versa.

A module or program module in various embodiments may include at least one of the components described above. An existing component of the module may be removed or a new component may be added to the module. Operations supported by a module, program module, or another component may be carried out in sequence, in parallel, by repetition, or heuristically. Some operations may be executed in a different order or may be omitted, and a new operation may be added. In addition, the disclosed embodiments are provided for explanation and understanding of technical details and are not intended to limit the scope of the present disclosure. Accordingly, the scope of the present disclosure should be construed as including all modifications and other embodiments based on the subject matter of the present disclosure.

The invention claimed is:

1. An electronic device comprising:
   at least one microphone;
   a speaker;
   a communication circuit;
   a memory for storing instructions; and
   a processor electrically connected with the at least one microphone, the speaker, the communication circuit, and the memory,
   wherein the instructions, when executed by the processor, cause the processor to:
      set a reference direction based on level of similarity between audio data received from an external device via the communication circuit and sound data for sound picked up by the at least one microphone;
      identify a direction for sound picked up by the at least one microphone; and
      process, for output through the speaker, the audio data received from the external device and the sound data for the sound picked up by the at least one microphone, the processing being based on a relationship between the reference direction and the identified direction.

2. The electronic device of claim 1, further comprising a housing including a portion configured for removable attachment to an ear of a user, wherein the at least one microphone, the speaker, the communication circuit, the processor, and the memory are included in the housing.

3. The electronic device of claim 2, wherein the instructions, when executed, cause the processor to:
   extract sound picked up within a range of directions relative to the reference direction from the picked up sound; and
   adjust an output level for sound corresponding to the extracted sound.

4. The electronic device of claim 1, wherein the instructions, when executed, cause the processor to adjust an output level for sound corresponding to the received audio data or sound corresponding to the picked up sound.

5. The electronic device of claim 4, wherein the instructions, when executed, cause the processor to adjust the output level for the sound corresponding to the received audio data or the sound corresponding to the picked up sound based at least partly on a signal or data received from a second external electronic device.

6. The electronic device of claim 1, wherein the instructions, when executed, cause the processor to:
   decrease an output level for sound corresponding to the picked up sound based on the identified direction being determined to correspond to the reference direction.

7. The electronic device of claim 6, wherein the instructions, when executed, cause the processor to increase the output level for the sound corresponding to the picked up sound based on the identified direction being determined to not correspond to the reference direction.

8. The electronic device of claim 1, wherein the instructions, when executed, cause the processor, based on the identified direction being determined to not correspond to the reference direction, to control output of a notification through the speaker or to control transmitting, to the external electronic device, a command for outputting a notification.

9. The electronic device of claim 1, further comprising a sensor configured to sense aspects of a state, attitude or movement of the electronic device, and wherein the instructions, when executed, cause the processor to set the reference direction based at least partly on data related to the aspects of state, attitude or movement sensed by the sensor.

10. A method of operation control for an electronic device, the method comprising:
    setting a reference direction based on a level of similarity between audio data received from an external device via a communication circuit of the electronic device and sound data for sound picked up by at least one microphone of the electronic device;
    identifying a direction for sound picked up by the at least one microphone; and
    processing, for output through the speaker, the audio data received from the external device and the sound data for the sound picked up by the at least one microphone, the processing being based on a relationship between the reference direction and the identified direction.

11. The method of claim 10, wherein the processing comprises adjusting an output level for sound corresponding to the received audio data or sound corresponding to the picked up sound.

12. An electronic device serving as an auditory device, comprising:
    at least one microphone;
    a speaker;
    a communication circuit;
    a memory for storing instructions; and
    a processor electrically connected with the at least one microphone, the speaker, the communication circuit, and the memory,
    wherein the instructions, when executed by the processor, cause the processor to:
       set a reference direction based on a signal received from an external electronic device:
       receive audio data from the external device via the communication circuit;
       extract sound picked up within a range of directions relative to the reference direction from sound picked up by the at least one microphone; and
       process, for output through the speaker, the audio data received from the external device and sound data for the extracted sound, the processing being based on a relationship between the reference direction and the identified direction and the processing comprising adjusting an output level for sound corresponding to the extracted sound data.

* * * * *